(12) United States Patent
Winkler et al.

(10) Patent No.: US 12,274,189 B2
(45) Date of Patent: Apr. 15, 2025

(54) VISION SYSTEM

(71) Applicant: Precision Planting LLC, Tremont, IL (US)

(72) Inventors: Nicholas Winkler, Gurnee, IL (US); Paul Wildermuth, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 77 days.

(21) Appl. No.: 18/043,968

(22) PCT Filed: Oct. 15, 2021

(86) PCT No.: PCT/IB2021/059508
§ 371 (c)(1),
(2) Date: Mar. 3, 2023

(87) PCT Pub. No.: WO2022/090851
PCT Pub. Date: May 5, 2022

(65) Prior Publication Data
US 2023/0328397 A1    Oct. 12, 2023

Related U.S. Application Data

(60) Provisional application No. 63/105,575, filed on Oct. 26, 2020, provisional application No. 63/105,566, (Continued)

(51) Int. Cl.
*A01B 69/00* (2006.01)
*A01B 69/04* (2006.01)
*A01C 23/04* (2006.01)
*A01M 7/00* (2006.01)
*B05B 12/08* (2006.01)
(Continued)

(52) U.S. Cl.
CPC .......... *A01B 69/001* (2013.01); *A01C 23/042* (2013.01); *A01M 7/0057* (2013.01); *A01M 7/0089* (2013.01); *A01M 7/0092* (2013.01); *B05B 12/082* (2013.01); *G03B 17/561* (2013.01); *H04N 7/181* (2013.01); *H04N 23/90* (2023.01); *A01B 69/008* (2013.01)

(58) Field of Classification Search
CPC . A01B 69/001; A01M 7/0057; A01M 7/0089; H04N 23/90; G03B 17/561
See application file for complete search history.

(56) References Cited

U.S. PATENT DOCUMENTS 10,255,670 B1    4/2019  Wu et al.
10,721,859 B2    7/2020  Wu et al.
(Continued)

FOREIGN PATENT DOCUMENTS

CN    108693807 A    10/2018
KR    20100108925 A    10/2010

OTHER PUBLICATIONS

European Patent Office, International Search Report related to International Patent Application No. PCT/IB2021/059508, mail date Jan. 20, 2022, 12 pages.
(Continued)

*Primary Examiner* — Minh Q Phan

(57) ABSTRACT

A system having a boom; a plurality of cameras attached to the boom; and a plurality of lenses on each camera; wherein not all lenses have a same field of view.

14 Claims, 20 Drawing Sheets

Related U.S. Application Data filed on Oct. 26, 2020, provisional application No. 63/105,552, filed on Oct. 26, 2020, provisional application No. 63/105,543, filed on Oct. 26, 2020, provisional application No. 63/105,584, filed on Oct. 26, 2020.

(51) Int. Cl.
  *G03B 17/56* (2021.01)
  *H04N 7/18* (2006.01)
  *H04N 23/90* (2023.01)

(56) References Cited

U.S. PATENT DOCUMENTS

| | | |
|---|---|---|
| 11,071,991 B2 | 7/2021 | Serrat et al. |
| 11,085,156 B2 | 8/2021 | Serrat et al. |
| 11,580,718 B2 | 2/2023 | Padwick et al. |
| 2019/0150357 A1* | 5/2019 | Wu .................. H04N 7/188 |
| 2020/0284886 A1 | 9/2020 | Stanhope |
| 2021/0068384 A1* | 3/2021 | McMenamy ....... A01M 7/0089 |
| 2021/0329906 A1 | 10/2021 | Taarnhøj et al. |
| 2022/0256832 A1 | 8/2022 | Serrat et al. |
| 2022/0330537 A1 | 10/2022 | Stuber et al. |

OTHER PUBLICATIONS

UK Intellectual Property Office, Search report for related UK Application No. GB2017235.8 dated Apr. 26, 2021, 4 pages.

\* cited by examiner

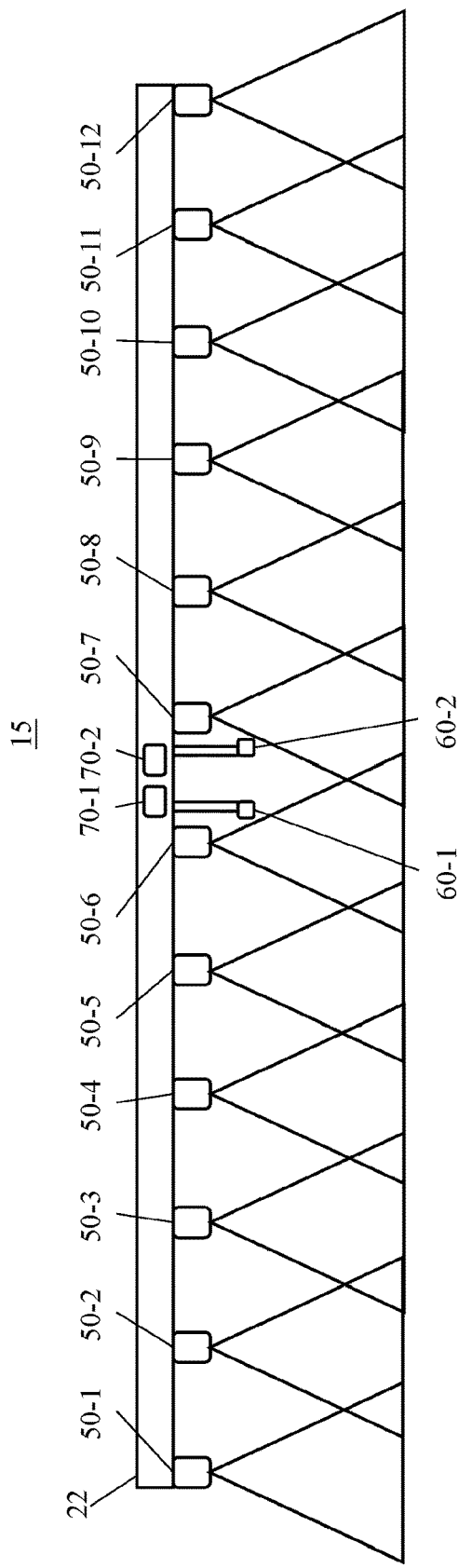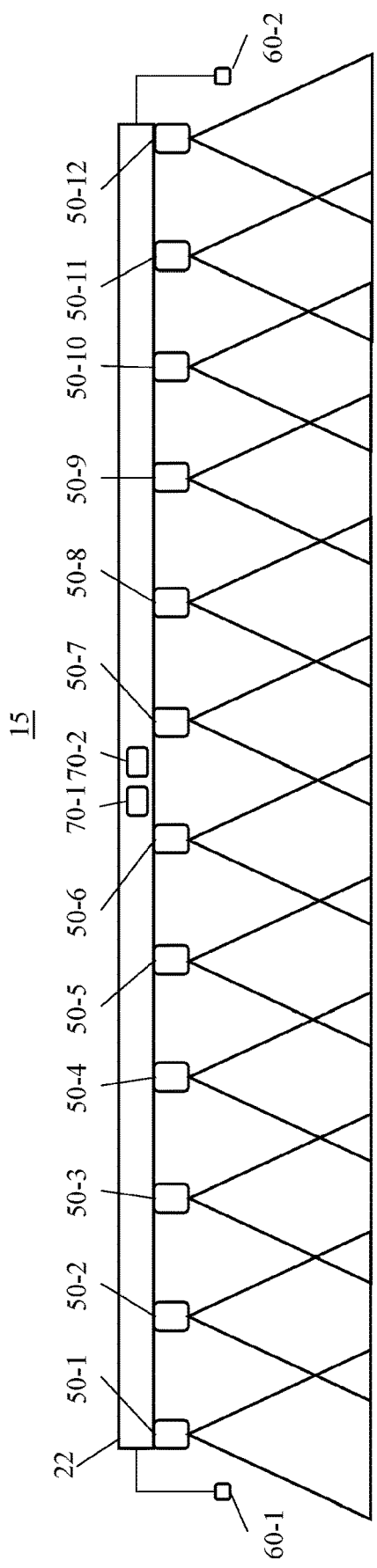

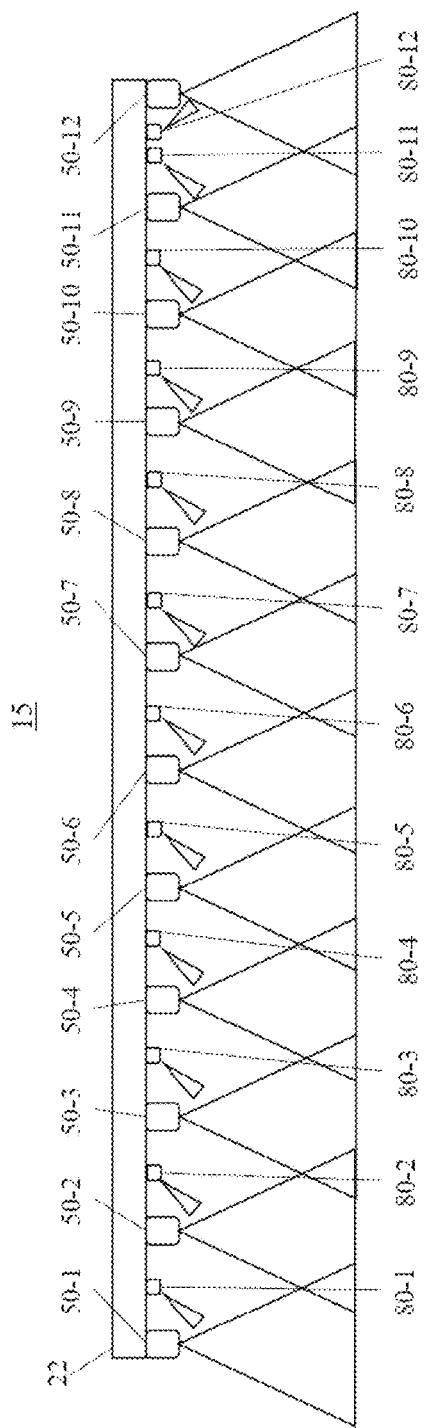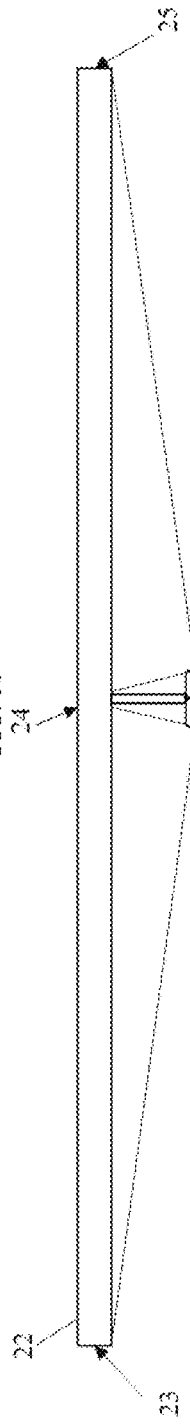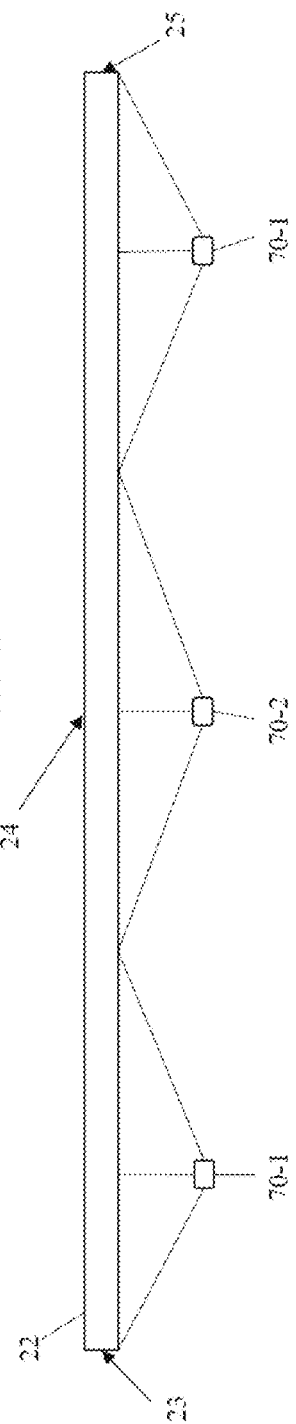

VISION SYSTEM

CROSS REFERENCE TO RELATED APPLICATIONS

This application is a national stage entry of PCT/IB2021/059508, filed 15 Oct. 2021, and which claims priority to U.S. Provisional Patent Application Nos. 63/105,543, filed 26 Oct. 2020; 63/105,552, filed 26 Oct. 2020; 63/105,566, filed 26 Oct. 2020; 63/105,575, filed 26 Oct. 2020; and 63/105,584, filed 26 Oct. 2020, all of which are incorporated herein by reference in their entireties.

BACKGROUND

Sprayers and other fluid application systems are used to apply fluids (such as fertilizer, herbicide, insecticide, and/or fungicide) to fields.

BRIEF DESCRIPTION OF THE DRAWINGS

FIG. 2 is a rear elevation view of a spray boom with cameras and lights according to one embodiment.

FIG. 3 is a rear elevation view of a spray boom with cameras and lights according to one embodiment.

FIG. 10 is a rear elevation view of a spray boom with a combined camera and light according to one embodiment.

FIG. 11 is a top plan view of a spray boom with cameras as in FIGS. 2 to 5.

FIG. 12 is a top plan view of a spray boom with cameras as in FIGS. 6 to 9.

DETAILED DESCRIPTION

All references cited herein are incorporated herein in their entireties. If there is a conflict between a definition herein and in an incorporated reference, the definition herein shall control.

Figure 1:
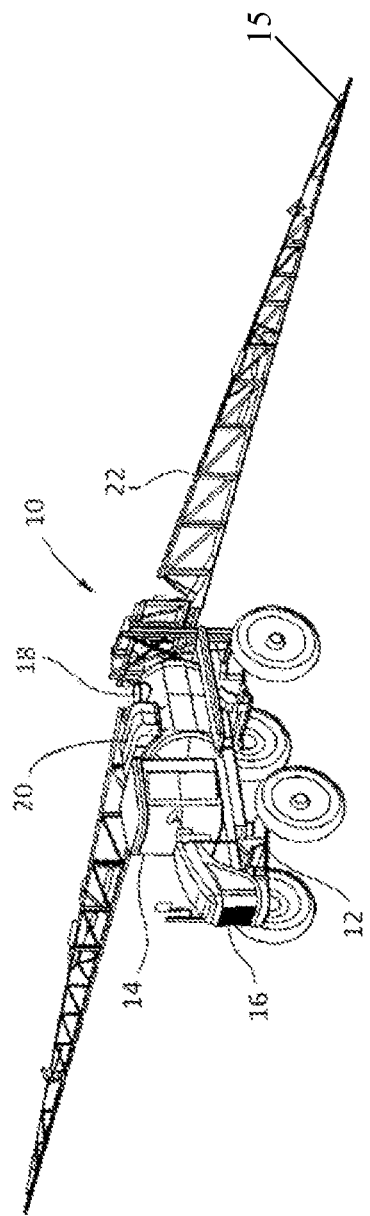
FIG. 1 is an illustration of an agricultural crop sprayer.

Referring to the drawings, wherein like reference numerals designate identical or corresponding parts throughout the several views, FIG. 1 illustrates an agricultural implement, such as a sprayer 10. While the system 15 can be used on a sprayer, the system can be used on any agricultural implement that is used to apply fluid to soil, such as a side-dress bar, a planter, a seeder, an irrigator, a center pivot irrigator, a tillage implement, a tractor, a cart, or a robot. A reference to boom or boom arm herein includes corresponding structures, such as a toolbar, in other agricultural implements.

FIG. 1 shows an agricultural crop sprayer 10 used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g. mounted on a 3-point linkage of an agricultural tractor.

The sprayer 10 further comprises a liquid storage tank 18 used to store a spray liquid to be sprayed on the field. The spray liquid can include chemicals, such as but not limited to, herbicides, pesticides, and/or fertilizers. Liquid storage tank 18 is to be mounted on chassis 12, either in front of or behind cab 14. The crop sprayer 10 can include more than one storage tank 18 to store different chemicals to be sprayed on the field. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

At least one boom arm 22 on the sprayer 10 is used to distribute the fluid from the liquid tank 18 over a wide swath as the sprayer 10 is driven through the field. The boom arm 22 is provided as part of a spray applicator system 15 as illustrated in FIGS. 1-10, 15 and 26, which further comprises an array of spray nozzles (in addition to lights, cameras, and processors described later) arranged along the length of the boom arm 22 and suitable sprayer plumbing used to connect the liquid storage tank 18 with the spray nozzles. The sprayer plumbing will be understood to comprise any suitable tubing or piping arranged for fluid communication on the sprayer 10. Boom arm 22 can be in sections to permit folding of the boom arm for transport. As illustrated in some figures, there is a left boom portion 22-1, a center boom portion 22-2, and a right boom portion 22-3.

Additional components that can be included, such as control modules or lights, are disclosed in PCT Publication No. WO2020/178663 and U.S. Application No. 63/050,314, filed 10 Jul. 2020, respectively.

Illustrated in FIGS. 2 to 9, there are a plurality of nozzles 50 (50-1 to 50-12) disposed on boom arm 22. While illustrated with 12 nozzles 50, there can be any number of nozzles 50 disposed on boom arm 22. Nozzles 50 dispense material (such as fertilizer, herbicide, or pesticide) in a spray. In any of the embodiments, nozzles 50 can be actuated with a pulse width modulation (PWM) actuator to turn the nozzles 50 on and off. In one example, the PWM actuator drives to a specified position (e.g., full open position, full closed position) according to a pulse duration, which is a length of the signal.

Illustrated in FIGS. 2 to 5, there are two cameras 70 (70-1 and 70-2) disposed on the boom arm 22 with each camera 70-1 and 70-2 disposed to view half of the boom arm 22 as seen in FIG. 11. Illustrated in FIGS. 6 to 9, there are a plurality of cameras 70 (70-1, 70-2, 70-3) each disposed on the boom arm 22 with each viewing a subsection of boom arm 22 as seen in FIG. 12. While illustrated with three cameras 70, there can be additional cameras 70. In the plurality of camera 70 embodiments, the cameras 70 can each be disposed to view an equal number of nozzles 50 or any number of nozzles 50.

Figure 6:
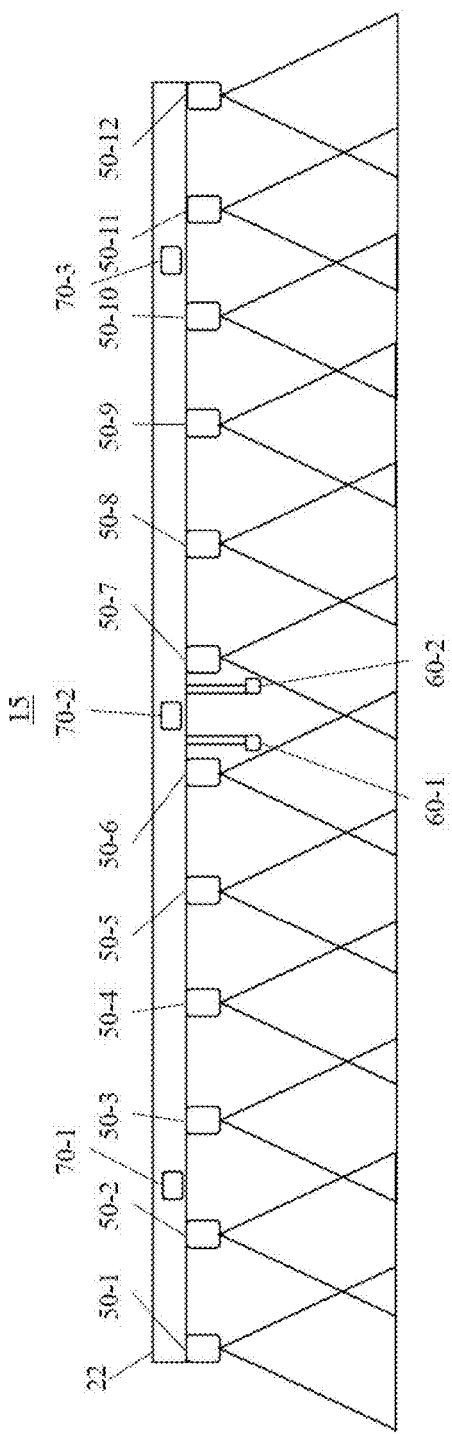
FIG. 6 is a rear elevation view of a spray boom with cameras and lights according to one embodiment.

FIGS. 2 and 6 illustrate two lights 60 (60-1, 60-2) that are disposed at a middle (24) of the boom arm 22 and disposed to each illuminate towards ends (23, 25) of boom arm 22.

Figure 7:
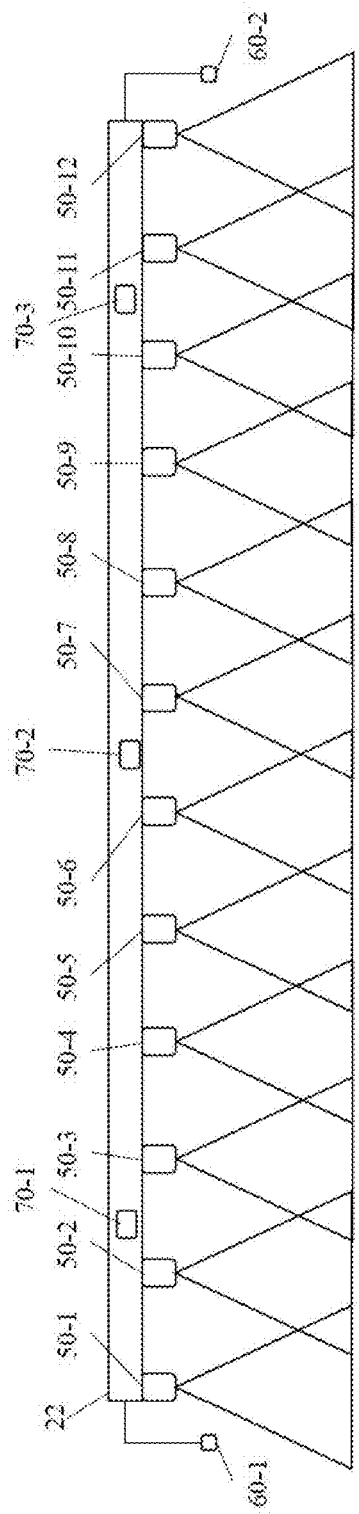
FIG. 7 is a rear elevation view of a spray boom with cameras and lights according to one embodiment.

FIGS. 3 and 7 illustrate two lights 60 (60-1, 60-2) that are disposed at the ends (23, 25) of boom arm 22 and disposed to illuminate towards the middle (24) of boom arm 22.

Figure 4:
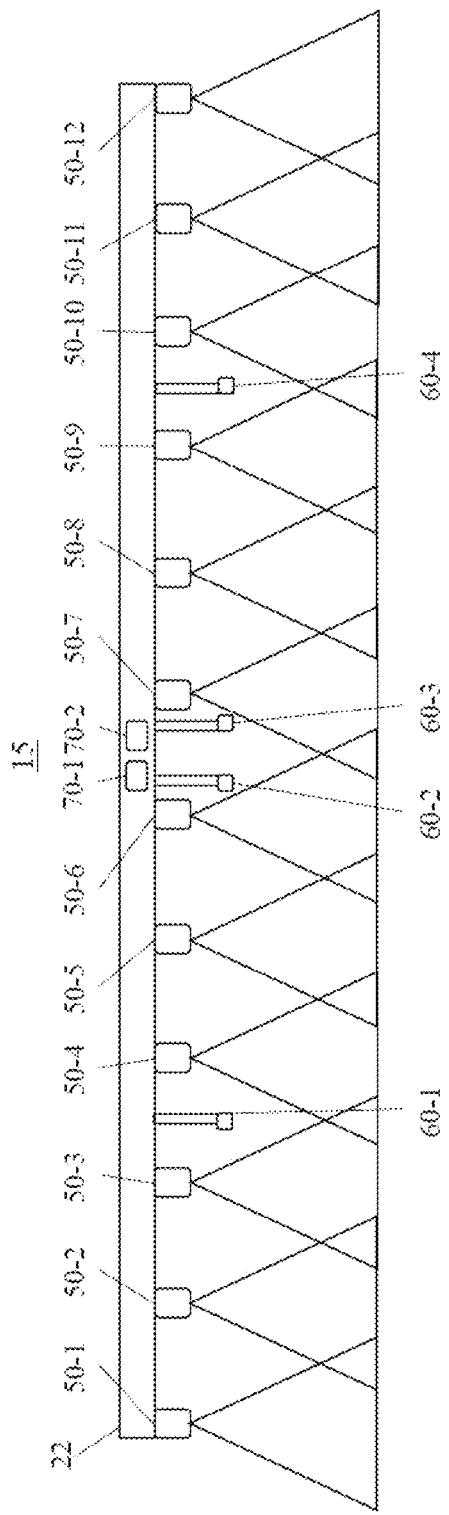
FIG. 4 is a rear elevation view of a spray boom with cameras and lights according to one embodiment.
Figure 8:
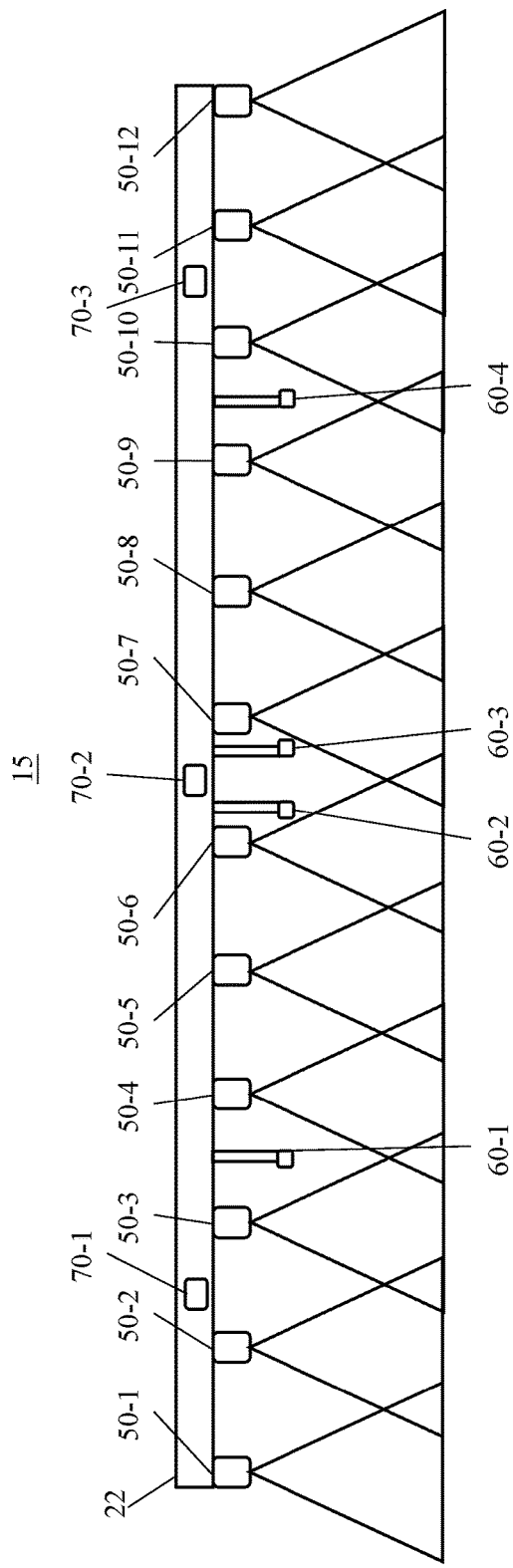
FIG. 8 is a rear elevation view of a spray boom with cameras and lights according to one embodiment.

FIGS. 4 and 8 illustrate a plurality of lights 60 (60-1, 60-2, 60-3, 60-4) that are disposed on boom arm 22 to illuminate a subset of nozzle sprays from nozzles 50. While illustrated with each light 60 illuminating three nozzles 50, the number of nozzles 50 illuminated can range from two to less than less than all nozzles 50.

Figure 5:
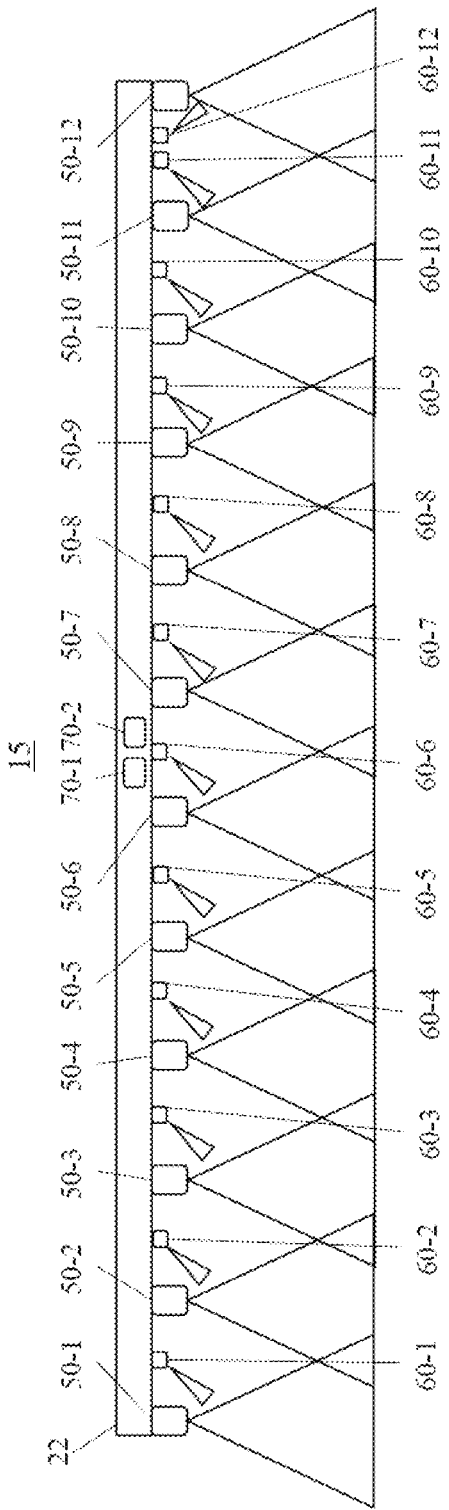
FIG. 5 is a rear elevation view of a spray boom with cameras and lights according to one embodiment.
Figure 9:
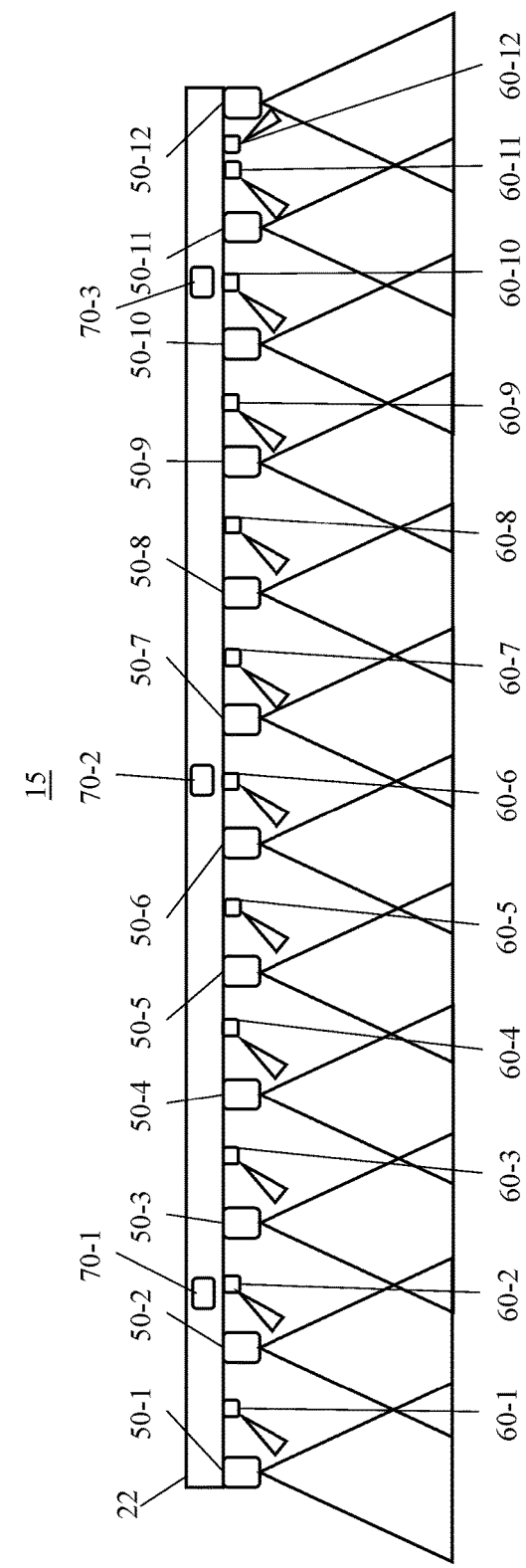
FIG. 9 is a rear elevation view of a spray boom with cameras and lights according to one embodiment.

FIGS. 5 and 9 illustrate a plurality of lights 60 (60-1 to 60-12) that are each disposed to illuminate one nozzle 50.

FIG. 10 illustrates a combined camera 70 and light 60 unit 80 (80-1 to 80-12). A reference to camera 70 is to either camera 70 or camera/light unit 80 unless otherwise specifically stated.

Camera 70 can be any type of camera. Examples of cameras include, but are not limited to, digital camera, line scan camera, monochrome, RGB (red, green blue), NIR (near infrared), SWIR (short wave infrared), MWIR (medium wave infrared), LWIR (long wave infrared), optical sensor (including receiver or transmitter/receiver), reflectance sensor, laser.

In any of the embodiments, camera 70 can be coordinated with the PWM of the nozzles 50. In one embodiment, camera 70 can capture images when the nozzle 50 is off and when nozzle 50 is on. The off image can be subtracted from the on image to eliminate background light from the image. While any wavelength of the electromagnetic spectrum can be used, in one embodiment, lights 60 can illuminate with blue light. In one embodiment, the wavelength of light from light 60 is in a range of 380-500 nm or 450 to 485 nm. In one embodiment, the frequency of PWM is 10 to 35 Hz.

In one embodiment, the camera 70 and nozzle 50 can be operated at the same frequency. In another embodiment, the cameras 70 can be operated at a different frequency from nozzles 50. Similar to aliasing, the camera can be operated at a frequency less than the nozzle 50 PWM frequency. In one embodiment, camera 70 can capture images at 9 Hz while the nozzles operate at 10 Hz.

In any of the embodiments, the angle of light from light 60 is not directly aligned with a camera 70.

In one embodiment, nozzles 50, lights 60, and cameras 70 are connected to a network. An example of a network is described in PCT Publication No. WO2020/039295A1 and is illustrated as implement network 150 in FIG. 29A and FIG. 29B.

Figure 14:
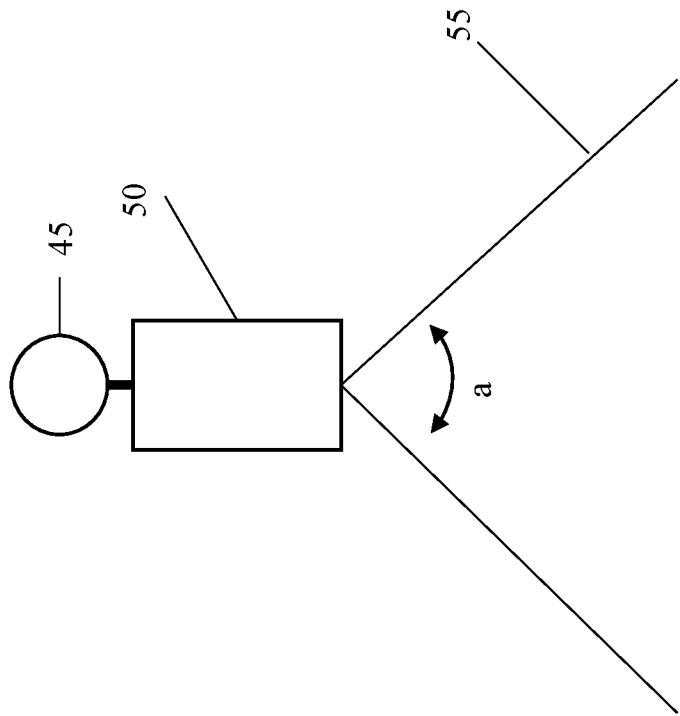
FIG. 14 is side elevation views of a spray pattern from a nozzle.
Figure 13:
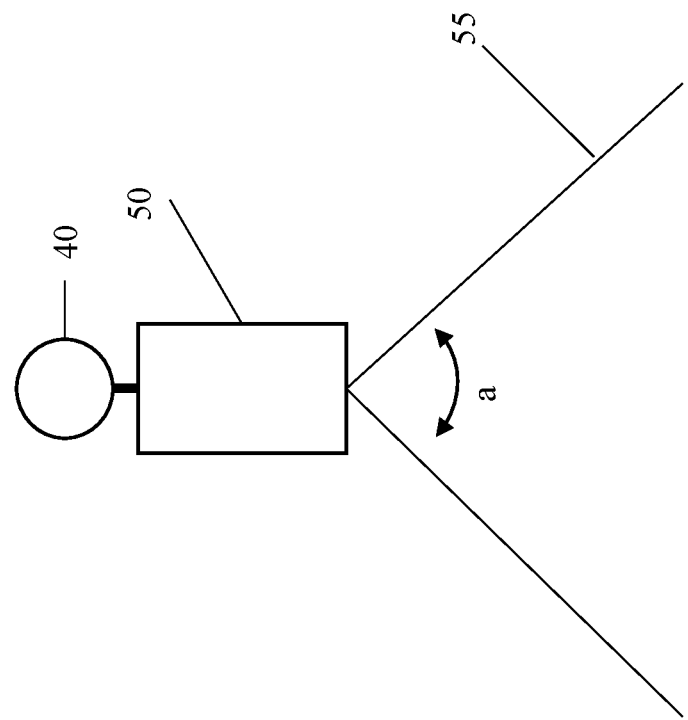
FIG. 13 is side elevation views of a spray pattern from a nozzle.
Figure 15:
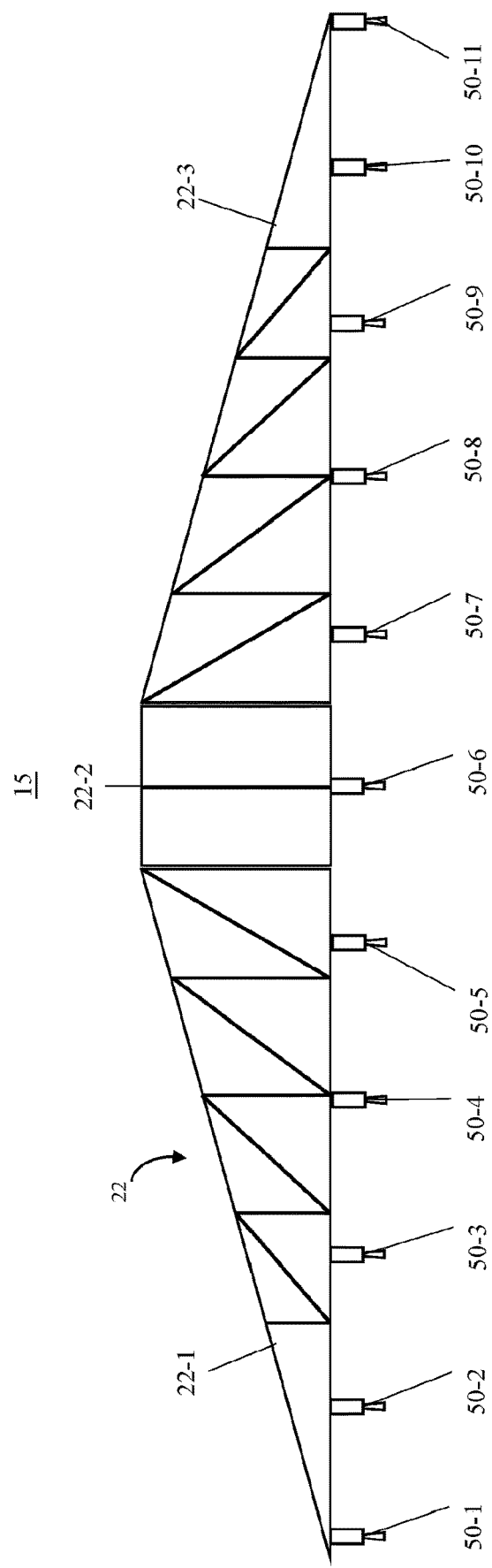
FIG. 15 is a rear elevation view of the boom arm of FIG. 1 according to one aspect.

FIGS. 13 and 14 illustrate a spray pattern 55 from nozzle 50 having a spray angle (a). Spray pattern 55 can be captured in an image from camera 70. The image can be analyzed (e.g., analyzed with artificial intelligence) as described below to determine pattern, uniformity, spray angle (a), and amount of light refracted. In FIG. 13, optional pressure sensor 40 can be installed anywhere before nozzle 50. In FIG. 14, optional flow meter 45 can be installed anywhere between nozzle 50 and the fluid source.

Spray angle (a) is a function of nozzle tip geometry, material viscosity, PWM duty cycle, pressure, and flow rate. For a given nozzle spraying a material under a specific duty cycle, these parameters are fixed. Any variation in spray angle (a) is related to changes in pressure or flow rate with one of these being fixed.

Figure 30:
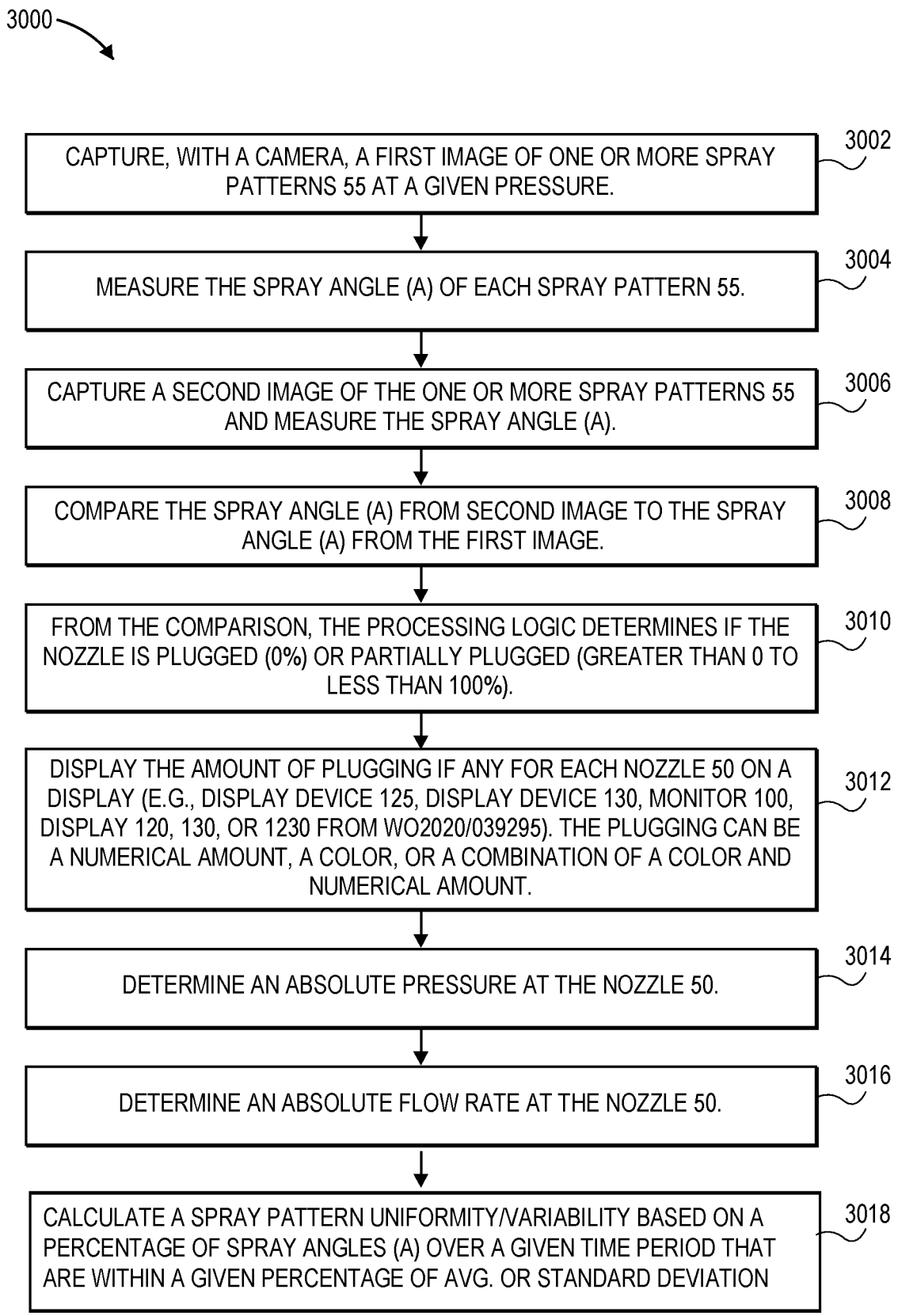
FIG. 30 illustrates a flow diagram of one embodiment for a computer-implemented method of using images captured by a camera to determine and monitor fluid characteristics for fluid being applied to a field by an implement.

FIG. 30 illustrates a flow diagram of one embodiment for a computer-implemented method of using images captured by a camera to determine and monitor fluid characteristics for fluid being applied to a field by an implement. The method 3000 is performed by processing logic that may comprise hardware (circuitry, dedicated logic, a processor, etc.), software (such as is run on a general purpose computer system or a dedicated machine or a device), or a combination of both. In one embodiment, the method 3000 is performed by processing logic (e.g., processing logic 126) of a processing system or of a monitor (e.g., monitor 1000). The camera can be attached to a boom as described herein.

At operation 3002, the computer-implemented method captures, with a camera, a first image of one or more spray patterns 55 at a given pressure. The spray angle (a) of each spray pattern 55 can be measured at operation 3004. A second image can be taken of the one or more spray patterns 55 and the spray angle (a) measured at operation 3006. The spray angle (a) from second image is compared to the spray angle (a) from the first image, at operation 3008. From the comparison, the processing logic determines if the nozzle is plugged (0%) or partially plugged (greater than 0 to less than 100%) at operation 3010. The amount of plugging if any for each nozzle 50 can be displayed on a display (e.g., display device 125, display device 130, monitor 100, display 120, 130, or 1230 from WO2020/039295, any device with a display) at operation 3012. The plugging can be a numerical amount, a color, or a combination of a color and numerical amount. For color, green can be used for no plugging, yellow for partial plugging, and red for totally plugged.

The absolute pressure at the nozzle 50 can be determined by the processing logic at operation 3014. From operating the nozzle 50 at different pressures and measuring the spray angle (a) of the spray patterns 55, a calibration curve can be created. By comparing the spray angle (a) from the second image, a pressure for nozzle 50 can be determined from the calibration curve. Alternatively, a pressure sensor 40 can be installed before one or more nozzles 50 to measure actual flow. A spray angle (a) of a nozzle 50 without a pressure sensor 40 can be compared to a spray angle (a) of a nozzle 50 with the pressure sensor 40. The difference in spray angle (a) provides a percentage difference that is converted to actual by multiplying the percentage difference by the pressure measured from pressure sensor 40. Each successive comparison between nozzles 50 can be based on the current pressure from pressure sensor 40.

The absolute flow rate at the nozzle 50 can be determined by the processing logic at operation 3016. From operating the nozzle 50 at different flow rates and measuring the spray angle (a) of the spray patterns 55, a calibration curve can be created. By comparing the spray angle (a) from the second image, a flow rate for nozzle 50 can be determined from the calibration curve. Alternatively, a flow meter 45 can be installed before one or more nozzles 50 to measure actual flow. A spray angle (a) of a nozzle 50 without a flow meter 45 can be compared to a spray angle (a) of a nozzle 50 with the flow meter 45. The difference in spray angle (a) provides a percentage difference that is converted to actual by multiplying the percentage difference by the flow rate measured from flow meter 45. Each successive comparison between nozzles 50 can be based on the current flow rate from flow meter 45.

In another embodiment, a spray pattern variability can be measured. For a given nozzle 50, multiple images of spray pattern 55 from nozzle 50 are obtained from camera 70. Spray angle (a) from multiple images can be used to calculate an average spray angle (a) for a nozzle 50 and/or a standard deviation for spray angle (a). A spray pattern uniformity/variability can be calculated based on a percentage of spray angles (a) over a given time period that are within a given percentage of average or standard deviation at operation 3018. Uniformity can be displayed as a numeric value and/or as a color, such as green, yellow, or red, with each successive color representing a larger deviation from the average and/or standard deviation. In one embodiment, green can represent a uniformity of at least 80%, at least 90%, at least 95%, or at least 99%. Red can represent uniformity less than 50%, less than 40%, less than 30%, less than 25%, less than 20%, or less than 10%. Yellow can represent a uniformity that is not any of the green uniformity values and not any of the red uniformity values.

Figure 31:
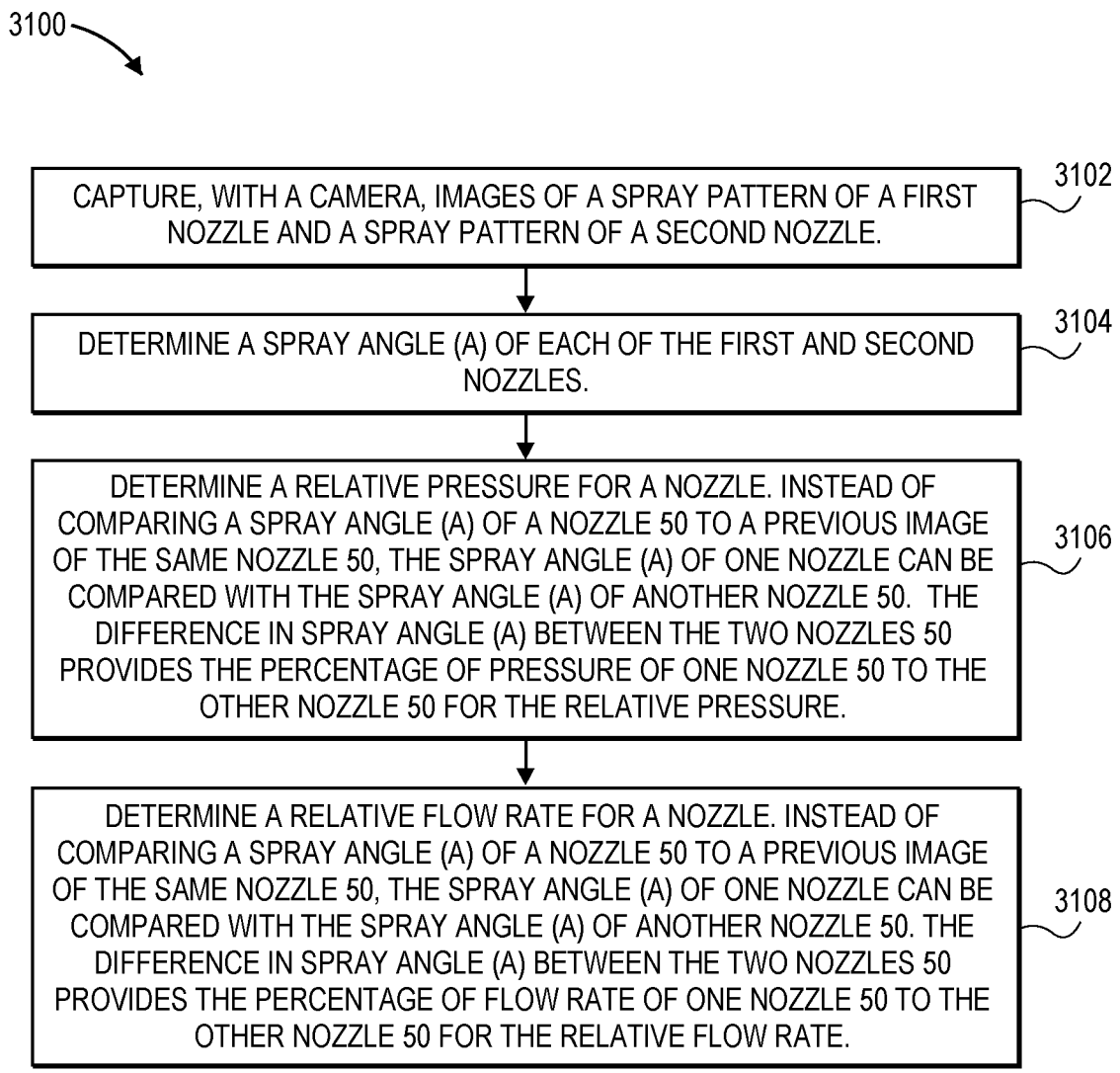
FIG. 31 illustrates a flow diagram of another embodiment for a computer-implemented method of using images captured by a camera to determine and monitor fluid characteristics for fluid being applied to a field by an implement.

In another embodiment, FIG. 31 illustrates a flow diagram of another embodiment for a computer-implemented method of using images captured by a camera to determine and monitor fluid characteristics for fluid being applied to a field by an implement. The method 3100 is performed by processing logic that may comprise hardware (circuitry, dedicated logic, a processor, etc.), software (such as is run on a general purpose computer system or a dedicated machine or a device), or a combination of both. In one embodiment, the method 3100 is performed by processing logic (e.g., processing logic 126) of a processing system or of a monitor (e.g., monitor 1000). The camera can be attached to a boom as described herein.

At operation 3102, a camera captures images of a spray pattern of a first nozzle and a spray pattern of a second nozzle. At operation 3104, the processing logic determines a spray angle (a) of each of the first and second nozzles. A relative pressure for a nozzle can be determined by processing logic. Instead of comparing a spray angle (a) of a nozzle 50 to a previous image of the same nozzle 50, the spray angle (a) of one nozzle can be compared with the spray angle (a) of another nozzle 50 at operation 3106. The difference in spray angle (a) between the two nozzles 50 provides the percentage of pressure of one nozzle 50 to the other nozzle 50 for the relative pressure.

In another embodiment, a relative flow rate for a nozzle can be determined by the processing logic. Instead of comparing a spray angle (a) of a nozzle 50 to a previous image of the same nozzle 50, the spray angle (a) of one nozzle can be compared with the spray angle (a) of another nozzle 50. The difference in spray angle (a) between the two nozzles 50 provides the percentage of flow rate of one nozzle 50 to the other nozzle 50 for the relative flow rate at operation 3108.

Any of the above measured parameters, such as spray angle (a), average of spray angle (a), standard deviation of spray angle (a), relative pressure, absolute pressure, relative flow rate, absolute flow rate, percent plugged, and/or spray pattern uniformity/variability, can be displayed on a display (e.g., display device 125, display device 130, monitor 100, display 120, 130, or 1230 from WO2020/039295, any device with a display). The parameters can be displayed as numeric values, mapped on the display, or both. The parameters can be displayed in split view with the applied flow rate and/or applied pressure.

Although the operations in the computer-implemented methods disclosed herein are shown in a particular order, the order of the actions can be modified. Thus, the illustrated embodiments can be performed in a different order, and some operations may be performed in parallel. Some of the operations listed in the methods disclosed herein are optional in accordance with certain embodiments. In one example of FIG. 30, the operations 3014, 3016, and 3018 are optional and may be removed from method 3000. In another example of FIG. 30, the operations 3010 and 3012 are optional and may be removed from method 3000. The numbering of the operations presented is for the sake of clarity and is not intended to prescribe an order of operations in which the various operations must occur. Additionally, operations from the various flows may be utilized in a variety of combinations.

Figure 16:
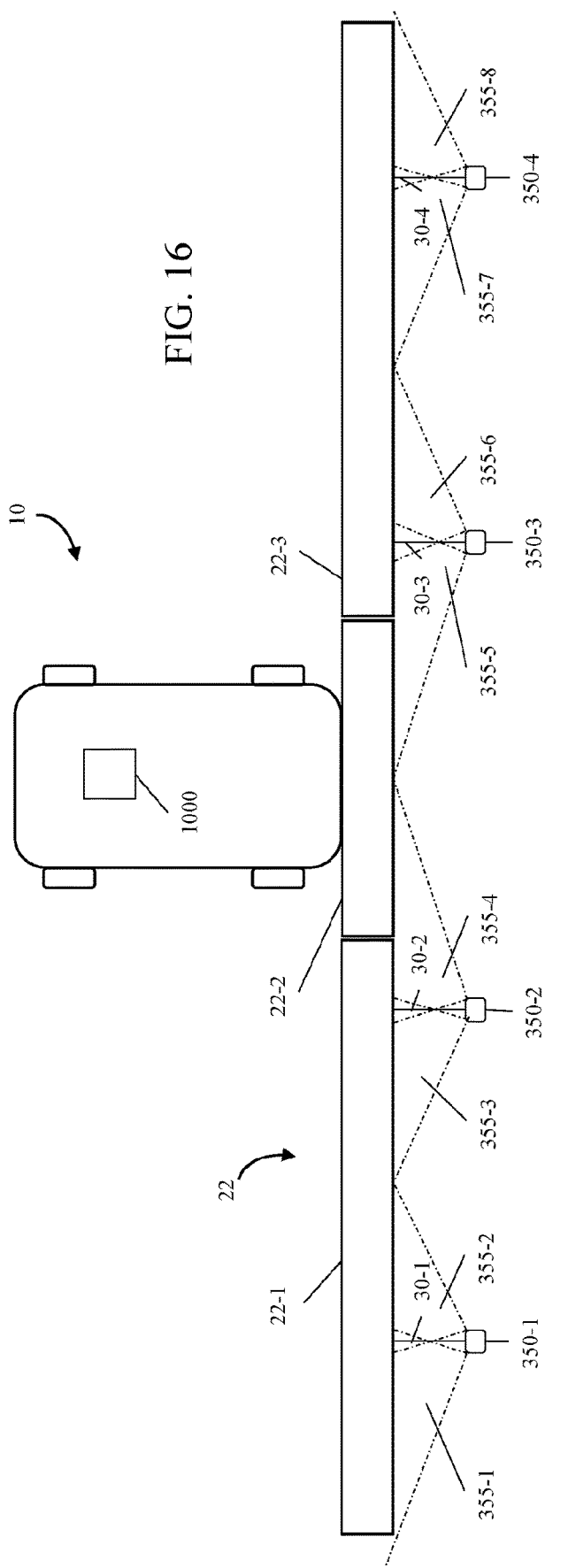
FIG. 16 is a top plan view of the sprayer of FIG. 1 according to one aspect.
Figure 17:
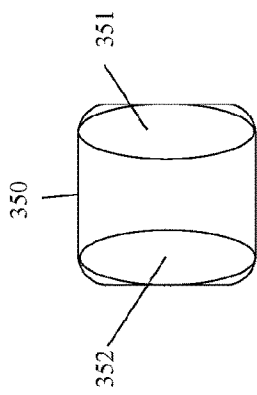
FIG. 17 is a front elevation view of a camera.

Cameras 350 can be installed at various locations across boom arm 22. Cameras 350 can have a plurality of lenses. An exemplary camera 350 is illustrated in FIG. 17 with lenses 351 and 352. Each lens 351 and lens 352 can have a different field of view 355. The different fields of view can be obtained by different focal lengths of the lens. Illustrated in FIG. 16 are a plurality of cameras 350 (350-1, 350-2, 350-3, and 350-4) disposed along boom arm 22 via arm 30 (30-1, 30-2, 30-3, and 30-4). In combination, cameras 350 are positioned to view all of the length of boom arm 22, and, optionally, beyond the end of boom arm 22 to view any drift. Cameras 350 can be positioned to view spray from nozzles 50 for flow, blockage, or drift, to view for guidance, for obstacle avoidance, to identify plants, to identify weeds, to identify insects, to identify diseases, or combinations thereof. In one embodiment, not all fields of view 355 are the same. Fields of view 355 can all be different from each other, or there can be two or more groups of fields of view in which the field of view of each field of view in the group is the same and different from the fields of view of other groups. Illustrated in FIG. 16, fields of view 355-1, 355-3, 355-5, and 355-7 are all the same and in a first group, and fields of view 355-2, 355-4, 355-6, and 355-8 are all the same and in a second group.

Figure 18:
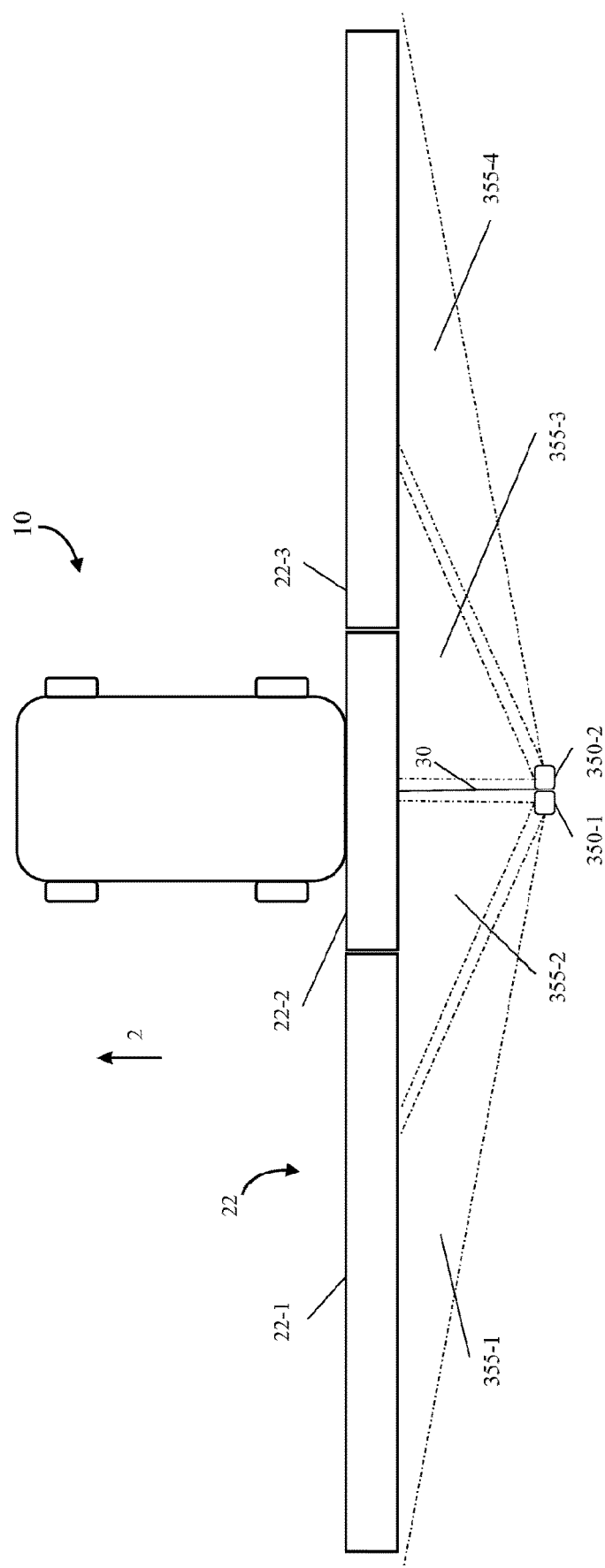
FIG. 18 is a top plan view of the sprayer of FIG. 1 according to one aspect.
Figure 19:
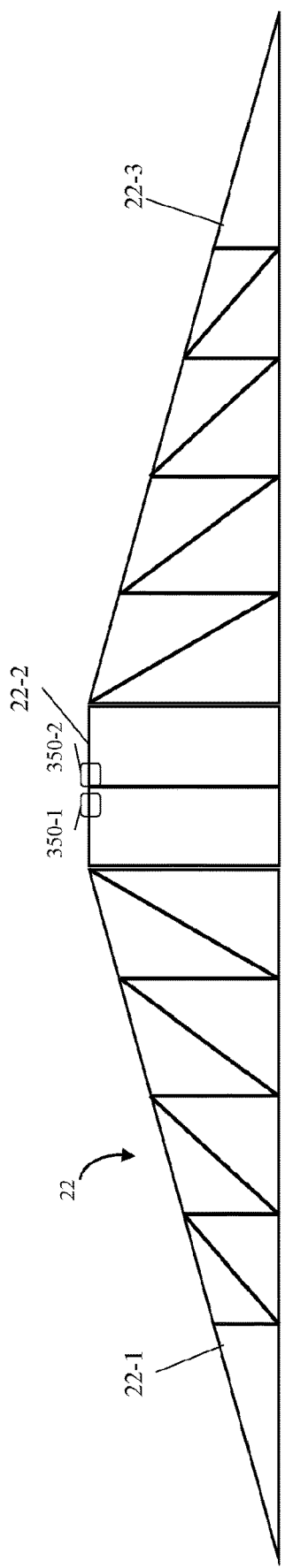
FIG. 19 is a rear elevation view of the boom arm of FIG. 1 according to one aspect.
Figure 20:
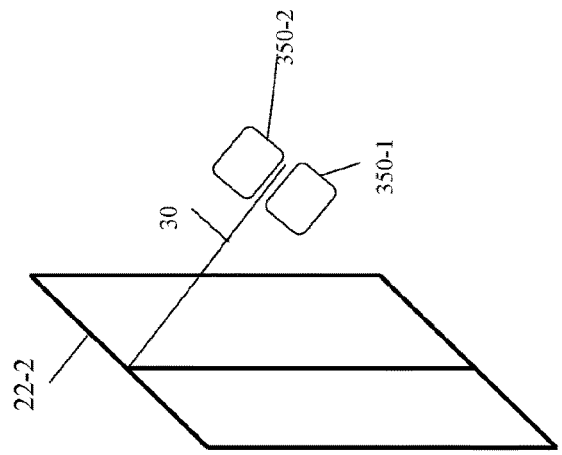
FIG. 20 is a perspective view of a portion of the boom arm of FIG. 17.
Figure 21:
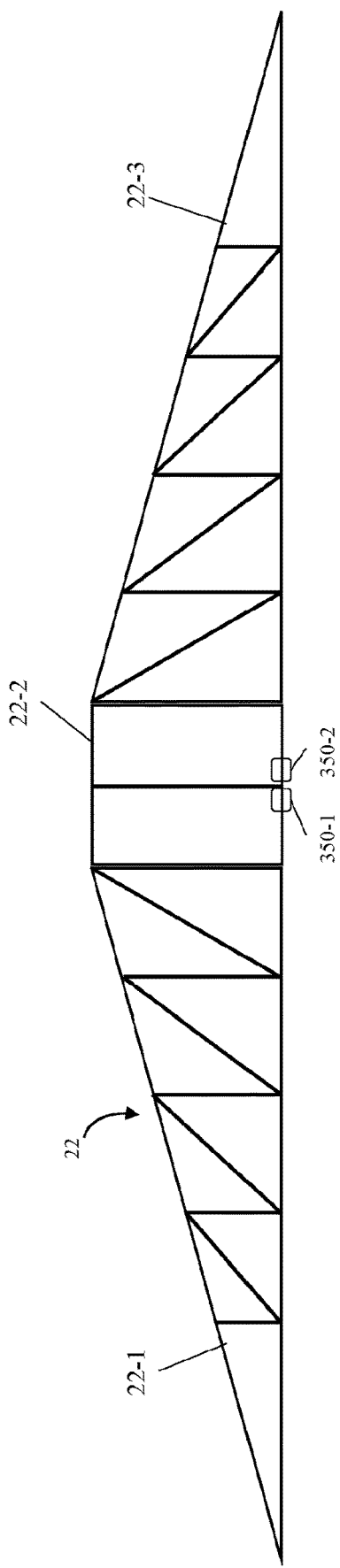
FIG. 21 is a rear elevation view of the boom arm of FIG. 1 according to one aspect.
Figure 22:
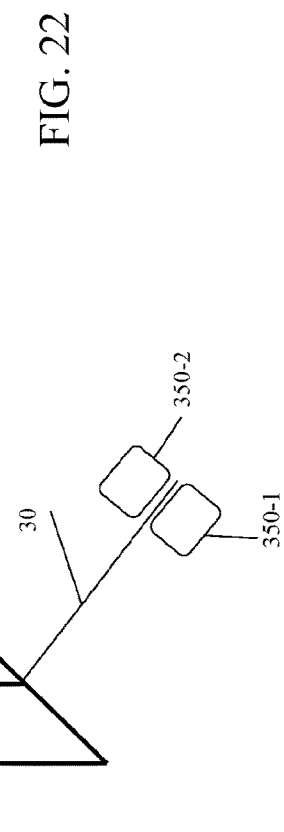
FIG. 22 is a perspective view of a portion of the boom arm of FIG. 21.

Illustrated in FIG. 18, there are two cameras 350 (350-1 and 350-2) that are disposed on arm 30 and positioned to view the entire boom arm 22, and optionally beyond boom arm 22. While illustrated on one arm 30, each camera 350-1 and 350-2 can be mounted on separate arms 30. Each camera 350-1 and 350-2 has a plurality of lenses to provide each camera 350-1 and 350-2 with two fields of view 355 (355-1 to 355-4). While illustrated with two lenses, cameras 350-1 and 350-2 can each have more lenses. The illustration in FIG. 18 reduces the number of cameras 350 needed to view along boom arm 22 to reduce cost and complexity.

While illustrated rearward of boom arm 22 along the direction of travel 2 of sprayer 10, cameras 350 can be disposed forward of boom arm 22 along a direction of travel 2 of sprayer 10. This can be beneficial when boom arm 22 is mounted to the front of sprayer 10 instead of the back, and boom arm 22 pivots rearwardly for transport.

Figure 23:
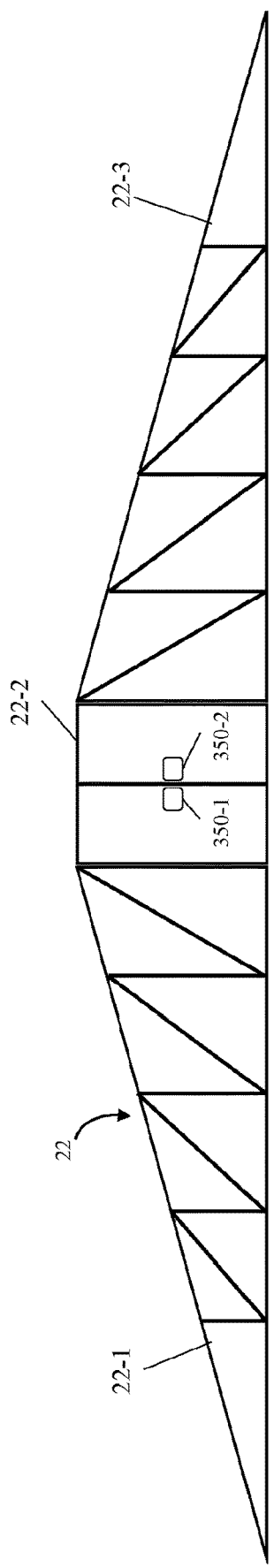
FIG. 23 is a rear elevation view of the boom arm of FIG. 22 according to one aspect.
Figure 24:
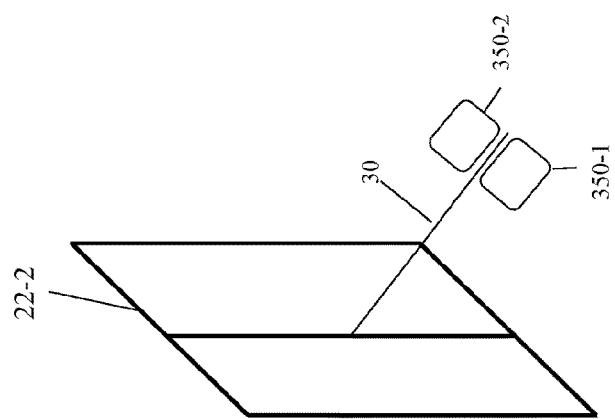
FIG. 24 is a perspective view of a portion of the boom arm of FIG. 23.
Figure 25:
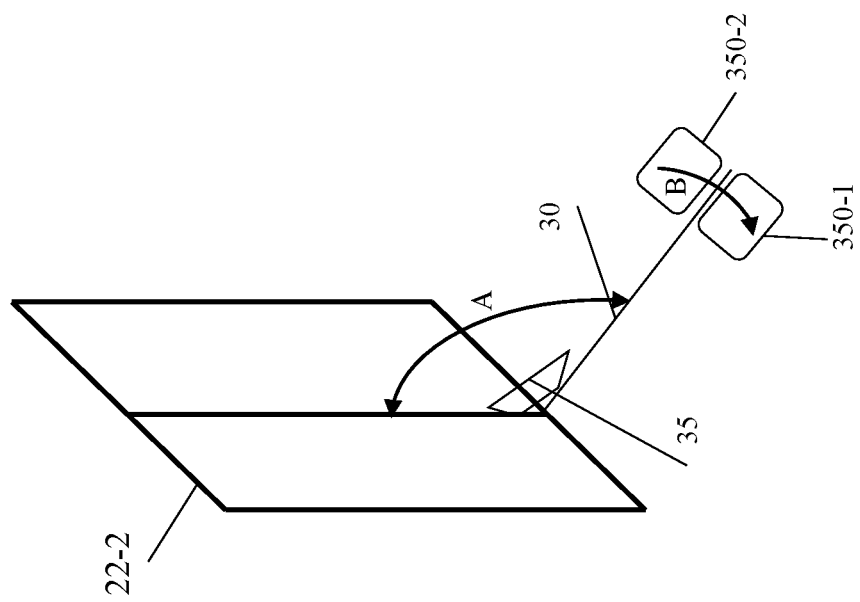
FIG. 25 is a perspective view of a portion a boom arm with a camera.

Each arm 30 can be mounted to boom arm 22 in a fixed or a movable attachment. A movable attachment allows arm 30 to be stored then deployed for use. The length of arm 30 is any length that accommodates camera 350 being positioned with its selected field of view 355. For arm 30, it can be deployed from a storage position to a working position either manually or automatically. When automatic, the deployment of arm 30 can be separately operated, or the deployment of arm 30 can be combined with the boom arm 22 deployment. In one embodiment, arm 30 is a telescoping arm. In another embodiment, arm 30 is a scissor actuator. In another embodiment, arm 30 has a fixed length and is attached to boom arm 22. In any of the preceding embodiments, arm 30 can be pivotally attached to boom arm 22. Some examples of pivoting attachment are illustrated in FIGS. 19 to 24. In any of the embodiments illustrated in FIGS. 19 to 24, arm 30 can pivot horizontally in a plane parallel to the ground to the left or right. Illustrated in FIGS. 19 and 20, arm 30 is mounted to a top of boom arm section 22-2 and is disposed to pivot downward for storage and upward for deployment. Illustrated in FIGS. 21 and 22, arm 30 is mounted to a bottom of boom arm section 22-2 and is disposed to pivot upward for storage and downward for deployment. In FIGS. 23 and 24, arm 30 is mounted in a position between the top and bottom of boom arm section 22-2. It can pivot up or down for deployment and the opposite for storage. For the actuation of arm 30, any actuator can be used. When an actuator receives a control signal, the actuator responds by converting the signal's energy into mechanical motion. An actuator requires a control signal and a source of energy. Example of actuators include, but are not limited to, hydraulic actuators, pneumatic actuators, electric linear actuators, and electric rotary actuators. Actuator 35 in one embodiment is illustrated in FIG. 25.

In another embodiment, the position of a camera 70, 350 relative to boom arm 22 can be adjusted via arm 30. One or more of a distance between camera 70, 350 and boom arm 22, an angle of arm 30 to boom arm 22, or a rotation (e.g., rotation B) of camera 350 to arm 30 can be adjusted. Illustrated in FIG. 25, actuator 35 can adjust angle A to any value from 0° to 180°. Arm 30 can also adjust a distance between boom arm 22 and camera 70, 350 as described above. Camera 70, 350 can also be rotationally connected to arm 30 about an axis or a distal end of the arm. Changing one or more of these adjustments can change the position of camera 70, 350. This allows camera 70, 350 to multitask between different operations. Camera 70, 350 can switch positions between guidance, obstacle avoidance, see and spray plants and/or weeds, and nozzle performance, such as spray pattern, blockage, and/or drift. This can reduce the total number of cameras needed. In this embodiment, camera 70 and camera 350 are both exemplified as there is no requirement for the number of lenses in the camera.

Cameras 70, 350 can be connected to a monitor 1000, such as the monitor disclosed in U.S. Pat. No. 8,078,367. Camera 70, 350 and monitor 1000 can each process the images captured by camera 70, 350 or share the processing of the images. In one embodiment, the images captured by camera 70, 350 can be processed in camera 70, 350, and the processed images can be sent to monitor 1000. In another embodiment, the images can be sent to monitor 1000 for processing. Processed images can be used to identify flow, to identify blockage, to identify drift, to view for guidance, for obstacle avoidance, to identify plants, to identify weeds, to identify insects, to identify diseases, or combinations thereof. Once identified, monitor 1000 can alert an operator of the condition and/or send a signal to a device to address the identified condition, such as to a nozzle 50 to activate to apply herbicide to a weed.

Figure 26:
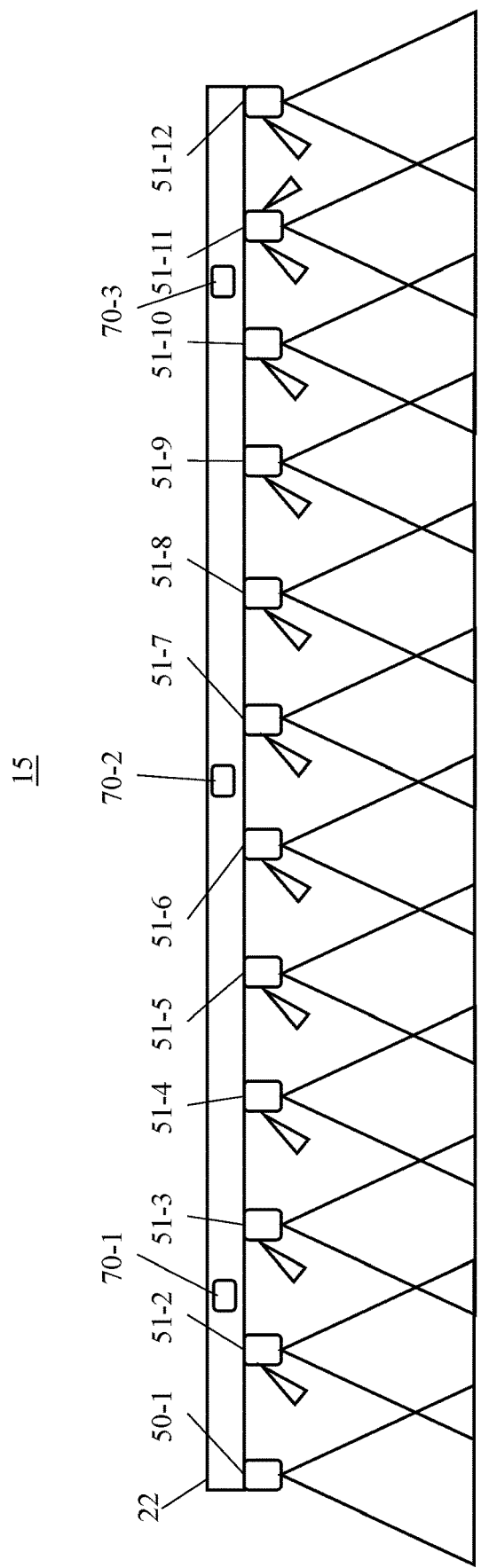
FIG. 26 is a rear elevation view of a spray boom with cameras and lights according to one embodiment.

Illustrated in FIG. 26 is an alternative nozzle 50 and light 60 combination. Nozzle assembly 51 (51-2 to 51-12) is a combined nozzle 50 and light 60. The light from one nozzle assembly 51 is disposed to illuminate the spray from an adjacent nozzle 50/nozzle assembly 51. There can be any combination of nozzles 50 and nozzle assemblies 51 disposed on the boom. Nozzle assembly 51 can contain multiple lights. For example in FIG. 26, nozzle assembly 51-11 can have two lights so that the spray from nozzle assembly 51-12 at the end of boom arm 22 is illuminated.

In any of the embodiments above with lights 60 or nozzle assembly 51, a light (60, 51) and camera (70, 350) can capture images of a spray pattern of a nozzle (50, 51). The camera, a processing system, or a monitor can include a processor that is configured to determine when the nozzle (50, 51) is spraying and not spraying and calculate a difference in time between spraying and not spraying to determine a pulse width modulation of nozzle (50, 51). The determined pulse width modulation can then be used to signal lights 60 and cameras (70, 350) when to be on to capture spraying from the nozzle (50, 51). This can be used with groups of nozzles (50, 51) when different groups are on versus off. For example, if there are two groups, the cameras (70, 350) associated with each group of nozzles (50, 51) can be operated to be on/off when the nozzles (50, 51) in that group are on/off.

Figure 27:
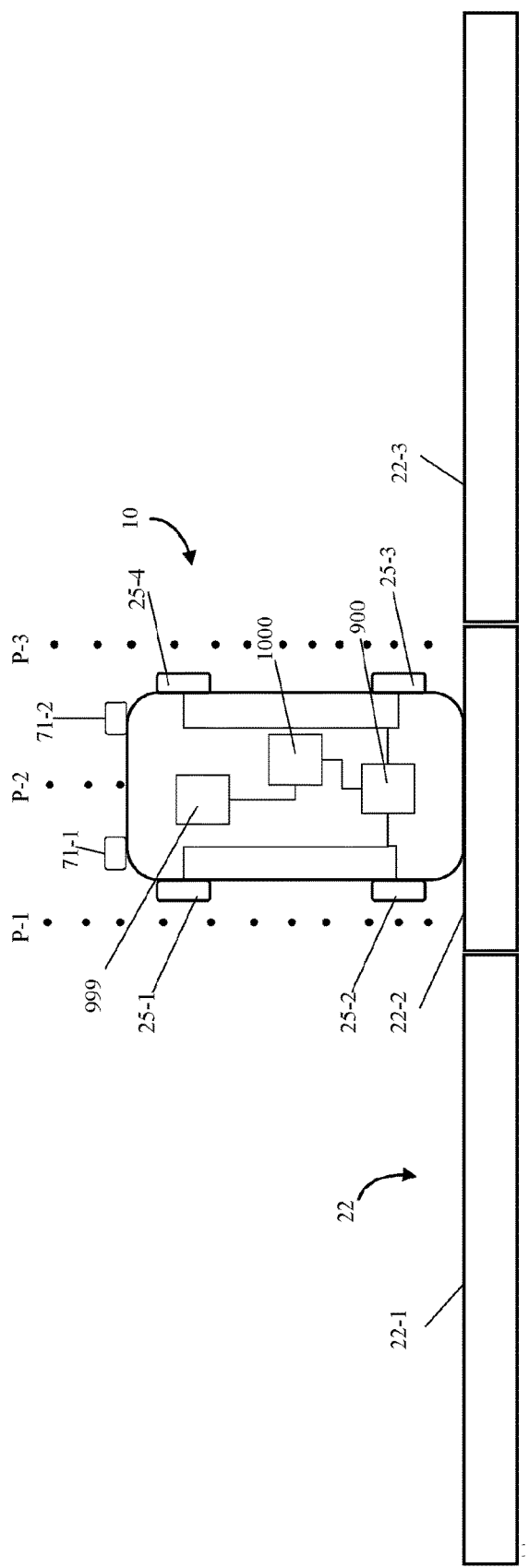
FIG. 27 is a top plan view of an implement with vision guidance.
Figure 28:
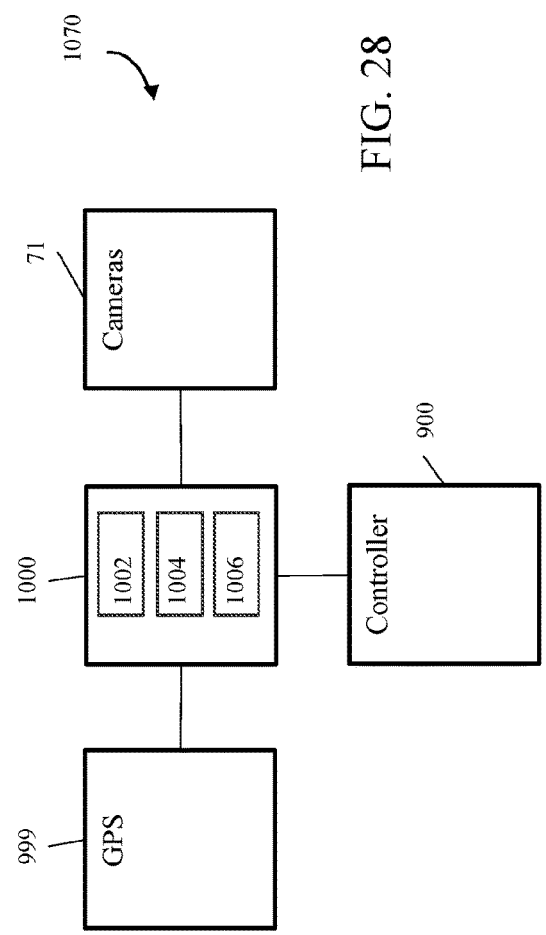
FIG. 28 is a block diagram of the network of FIG. 27.

An implement 10 that has an autosteer controller 900 can be retrofitted with a vision guidance system 1070 that includes cameras 71 and monitor 1000 as illustrated in FIGS. 27 and 28. Implement 10 can be any implement that has autosteer, such as a tractor or sprayer. An autosteer controller 900 receives signals from a global positioning system (GPS) 999 to automatically direct steering of the implement 10 through actuators that steer the wheels or tracks of the implement 10 to be aligned in spacing between rows of plants P-1, P-2, and P-3. In one example, a first set of wheels 25-1, 25-2 or track on a left side of implement are aligned in a row spacing between rows of plants P-1 and P-2 while a second set of wheels 25-3, 25-4 or track on a right side of the implement are aligned in a row spacing between rows of plants P-2 and P-3 to avoid damaging the rows of plants. Automatically directing steering of the implement can be performed without intervention from a user. Instead of having to discard an autosteer controller 900 to install a new one that interfaces with a vision guidance system, the existing autosteer control 900 can be retained and corrections to steering can be effected by offsetting the GPS coordinates sent to the autosteer controller 900. GPS 999 is disconnected from autosteer controller 900 and connected to monitor 1000. The monitor 1000 includes at least one processor 1002, memory 1004, and a display device 1006 with a graphical user interface. Monitor 1000 is in communication with at least one camera 71 (which can be the same as camera 70 or 350). Illustrated in FIG. 27, there are two cameras 71-1 and 71-2, which are in communication with monitor 1000. Images from cameras 71-1 and 71-2 can be processed in cameras 71-1 and 71-2, or they can be processed by monitor 1000 similar to above. Images are processed to determine whether implement 10 is driving a desired course, such as between rows of crops. If it is determined that a steering correction is needed to stay within a row, a GPS offset is calculated based on the current GPS coordinates and the required GPS coordinates. The GPS offset is used to create a modified GPS coordinate that is sent from monitor 1000 to autosteer controller 900, which will then steer implement 10 on a desired course.

Figure 29A:
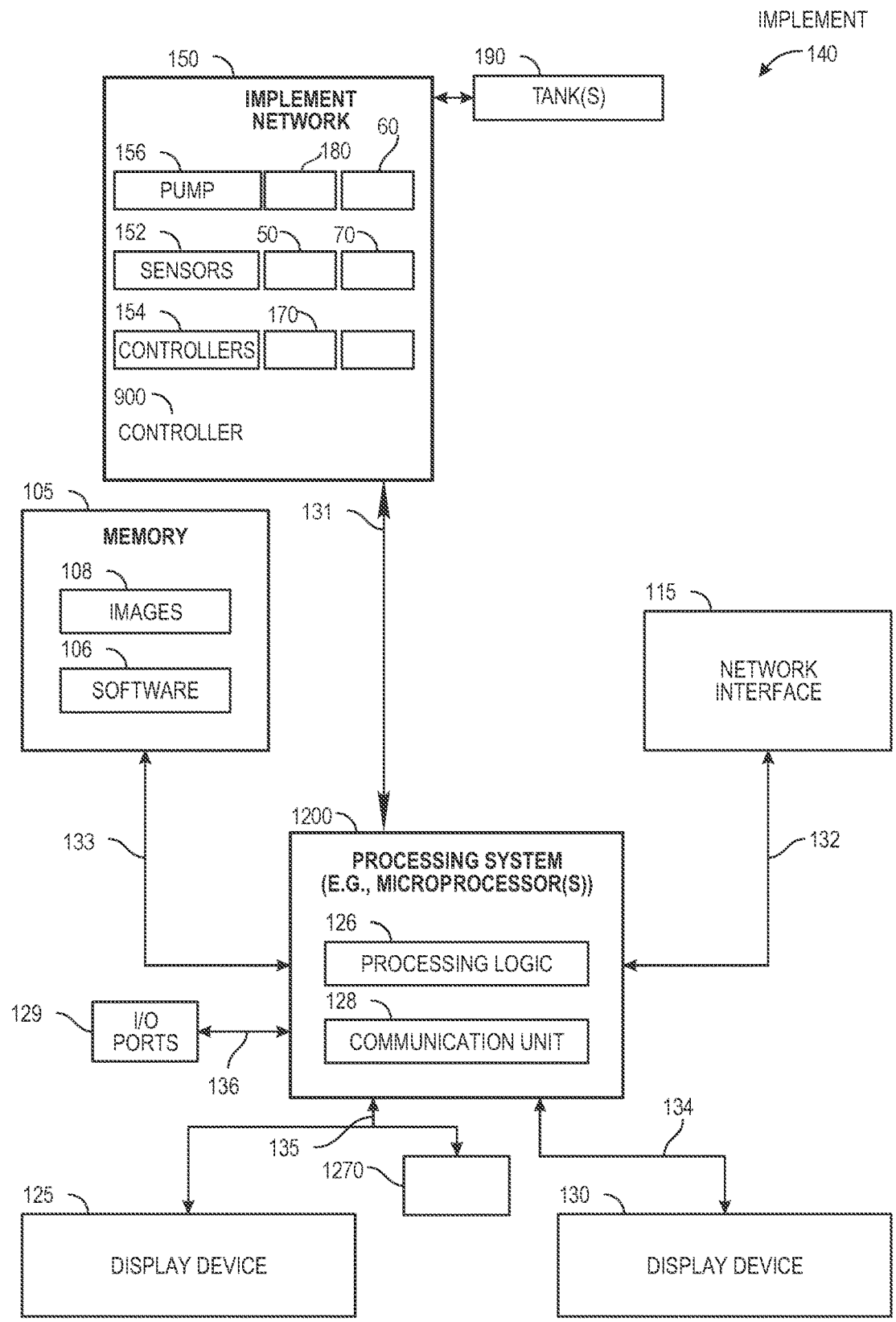
FIG. 29A shows an example of a block diagram of a self-propelled implement 140 (e.g., sprayer, spreader, irrigation implement, etc.) in accordance with one embodiment.

FIG. 29A shows an example of a block diagram of a self-propelled implement 140 (e.g., sprayer, spreader, irrigation implement, etc.) in accordance with one embodiment. The implement 140 includes a processing system 1200, memory 105, and a network interface 115 for communicating with other systems or devices. The network interface 115 can include at least one of a GPS transceiver, a WLAN transceiver (e.g., WiFi), an infrared transceiver, a Bluetooth transceiver, Ethernet, or other interfaces from communications with other devices and systems. The network interface 115 may be integrated with the implement network 150 or separate from the implement network 150 as illustrated in FIG. 29A. The I/O ports 129 (e.g., diagnostic/on board diagnostic (OBD) port) enable communication with another data processing system or device (e.g., display devices, sensors, etc.).

In one example, the self-propelled implement 140 performs operations for fluid applications of a field. Data associated with the fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the network interface 115 or implement network 150. The communication unit 128 may be integrated with the processing system or separate from the processing system.

Processing logic 126 including one or more processors may process the communications received from the communication unit 128 including agricultural data (e.g., planting data, GPS data, fluid application data, flow rates, etc.). The system 1200 includes memory 105 for storing data and programs for execution (software 106) by the processing system. The memory 105 can store, for example, software components such as fluid application software for analysis of fluid applications for performing operations of the present disclosure, or any other software application or module, images (e.g., captured images of crops, images of a spray pattern for rows of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1200 communicates bi-directionally with memory 105, implement network 150, network interface 115, display device 130, display device 125, and I/O ports 129 via communication links 131-136, respectively.

Display devices 125 and 130 can provide visual user interfaces for a user or operator. The display devices may include display controllers. In one embodiment, the display device 125 is a portable tablet device or computing device with a touchscreen that displays data (e.g., planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied liquid or fluid application data, as-planted or as-harvested data, yield data, controlling an implement (e.g., planter, tractor, combine, sprayer, etc.), steering the implement, and monitoring the implement (e.g., planter, combine, sprayer, etc.). A cab control module 1270 may include an additional control module for enabling or disabling certain components or devices of the implement.

The implement 140 (e.g., planter, cultivator, plough, sprayer, spreader, irrigation, implement, etc.) includes an implement network 150 having multiple networks. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication module 180 for receiving communications from controllers and sensors and transmitting these communications. In one example, the implement network 150 includes nozzles 50, lights 60, and vision guidance system 70 having cameras and processors for various embodiments of this present disclosure.

Sensors 152 (e.g., speed sensors, seed sensors for detecting passage of seed, downforce sensors, actuator valves, OEM sensors, flow sensors, etc.), controllers 154 (e.g., drive system, GPS receiver), and the processing system 120 control and monitoring operations of the implement.

The OEM sensors may be moisture sensors or flow sensors, speed sensors for the implement, fluid application sensors for a sprayer, or vacuum, lift, lower sensors for an implement. For example, the controllers may include processors in communication with a plurality of sensors. The processors are configured to process data (e.g., fluid application data) and transmit processed data to the processing system 120. The controllers and sensors may be used for monitoring motors and drives on the implement.

Figure 29B:
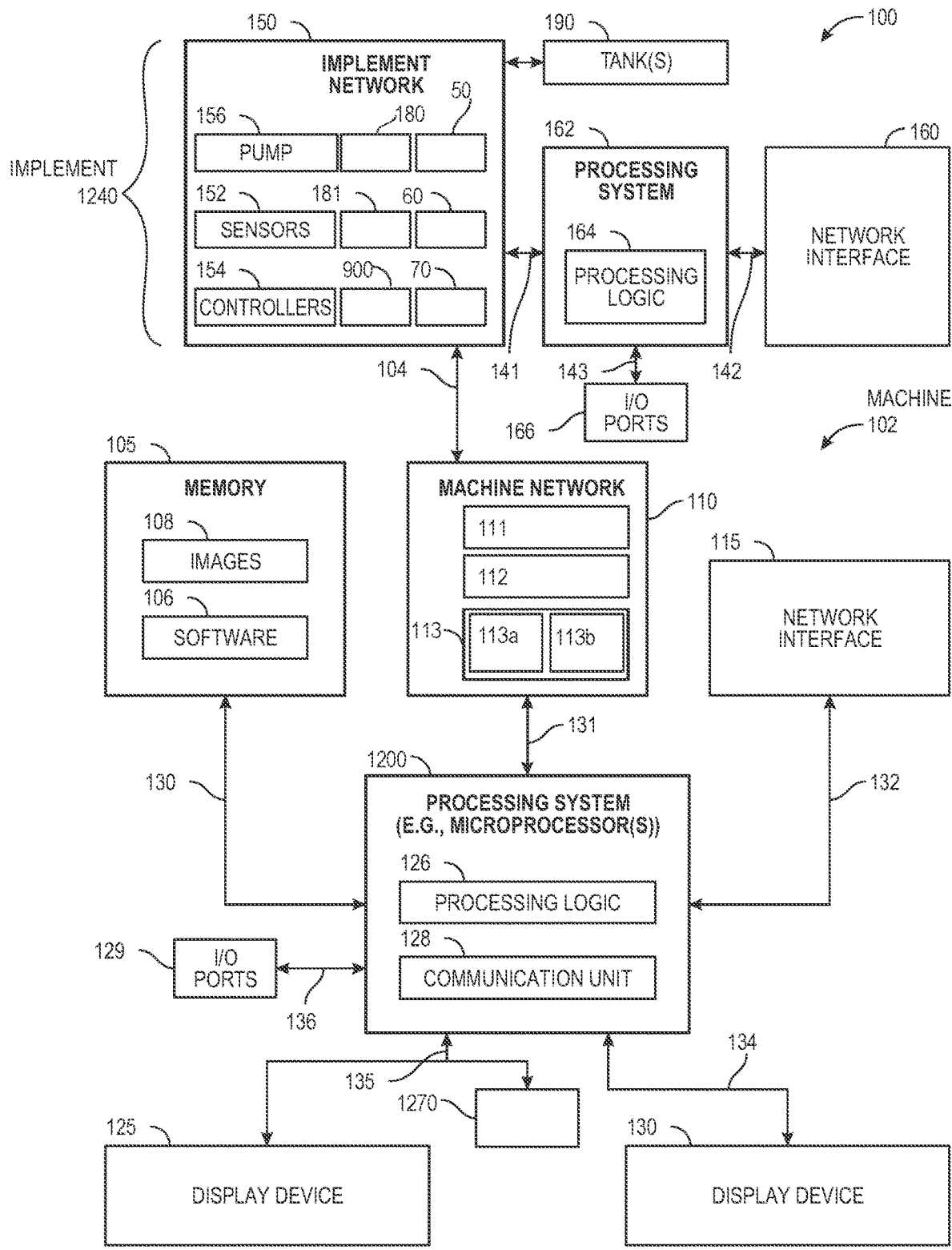
FIG. 29B shows an example of a block diagram of a system 100 that includes a machine 102 (e.g., tractor, combine harvester, etc.) and an implement 1240 (e.g., planter, cultivator, plough, sprayer, spreader, irrigation implement, etc.) in accordance with one embodiment.

FIG. 29B shows an example of a block diagram of a system 100 that includes a machine 102 (e.g., tractor, combine harvester, etc.) and an implement 1240 (e.g., planter, cultivator, plough, sprayer, spreader, irrigation implement, etc.) in accordance with one embodiment. The machine 102 includes a processing system 1200, memory 105, machine network 110 that includes multiple networks (e.g., an Ethernet network, a network with a switched power line coupled with a communications channel (e.g., Power over Ethernet (PoE) network), a controller area network (CAN) serial bus protocol network, an ISOBUS network, etc.), and a network interface 115 for communicating with other systems or devices including the implement 1240. The machine network 110 includes sensors 112 (e.g., speed sensors), controllers 111 (e.g., GPS receiver, radar unit) for controlling and monitoring operations of the machine or implement. The network interface 115 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 115 may be integrated with the machine network 110 or separate from the machine network 110 as illustrated in FIG. 29B. The I/O ports 129 (e.g., diagnostic/on board diagnostic (OBD) port) enable communication with another data processing system or device (e.g., display devices, sensors, etc.).

In one example, the machine is a self-propelled machine that performs operations of a tractor that is coupled to and tows an implement for planting or fluid applications of a field. Data associated with the planting or fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic/OBD port of the I/O ports 129 or via network devices 113a and 113b. A communication module 113 includes network devices 113a and 113b. The communication module 113 may be integrated with the communication unit 128 or a separate component.

Processing logic 126 including one or more processors may process the communications received from the communication unit 128 including agricultural data (e.g., planting data, GPS data, liquid application data, flow rates, etc.). The system 1200 includes memory 105 for storing data and programs for execution (software 106) by the processing system. The memory 105 can store, for example, software components such as planting application software for analysis of planting applications for performing operations of the present disclosure, or any other software application or module, images (e.g., captured images of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 120 communicates bi-directionally with memory 105, machine network 110, network interface 115, display device 130, display device 125, and I/O ports 129 via communication links 130-136, respectively.

Display devices 125 and 130 can provide visual user interfaces for a user or operator. The display devices may include display controllers. In one embodiment, the display device 125 is a portable tablet device or computing device with a touchscreen that displays data (e.g., planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied liquid or fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation, implement, etc.) includes an implement network 150 having multiple networks, a processing system 162 having processing logic 164, a network interface 160, and optional input/output ports 166 for communicating with other systems or devices including the machine 102. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication modules (e.g., 180, 181) for receiving communications from controllers and sensors and transmitting these communications to the machine network. In one example, the communication modules include first and second network devices with network ports. A first network device with a port (e.g., CAN port) of communication module (CM) 180 receives a communication with data from controllers and sensors, this communication is translated or converted from a first protocol into a second protocol for a second network device (e.g., network device with a switched power line coupled with a communications channel, Ethernet), and the second protocol with data is transmitted from a second network port (e.g., Ethernet port) of CM 180 to a second network port of a second network device 113*b* of the machine network 110. A first network device 113*a* having first network ports (e.g., 1-4 CAN ports) transmits and receives communications from first network ports of the implement. In one example, the implement network 150 includes nozzles 50, lights 60, vision guidance system 70 having cameras and processors, and autosteer controller 900 for various embodiments of this present disclosure. The autosteer controller 900 may also be part of the machine network 110 instead of being located on the implement network 150 or in addition to being located on the implement network 150.

Sensors 152 (e.g., speed sensors, seed sensors for detecting passage of seed, downforce sensors, actuator valves, OEM sensors, flow sensors, etc.), controllers 154 (e.g., drive system for seed meter, GPS receiver), and the processing system 162 control and monitoring operations of the implement.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 162 or 120. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a GPS transceiver, a WLAN transceiver (e.g., WiFi), an infrared transceiver, a Bluetooth transceiver, Ethernet, or other interfaces from communications with other devices and systems including the machine 102. The network interface 160 may be integrated with the implement network 150 or separate from the implement network 150 as illustrated in FIG. 29B.

The processing system 162 communicates bi-directionally with the implement network 150, network interface 160, and I/O ports 166 via communication links 141-143, respectively. The implement communicates with the machine via wired and possibly also wireless bi-directional communications 104. The implement network 150 may communicate directly with the machine network 110 or via the network interfaces 115 and 160. The implement may also by physically coupled to the machine for agricultural operations (e.g., planting, harvesting, spraying, etc.). The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 1200 during execution thereof by the system 100, the memory and the processing system also constituting machine-accessible storage media. The software 1206 may further be transmitted or received over a network via the network interface 115.

In one example, the implement 140, 1240 is an autosteered implement comprising a self-propelled implement with an autosteer controller 900 for controlling traveling of the self-propelled implement. The controllers 154 include a global positioning system to provide GPS coordinates. The vision guidance system 70 includes at least one camera and a processor. The global positioning system is in communication with the processor, and the processor is in communication with the autosteer controller. The processor is configured to modify the GPS coordinates to a modified GPS coordinates to maintain a desired travel for the self-propelled implement.

In another example, the machine 102 is an autosteered machine comprising a self-propelled machine with an autosteer controller 900 for controlling traveling of the self-propelled machine and any implement that is coupled to the machine. The controllers 154 include a global positioning system to provide GPS coordinates. The vision guidance system 70 includes at least one camera and a processor. The global positioning system is in communication with the processor, and the processor is in communication with the autosteer controller. The processor is configured to modify the GPS coordinates to a modified GPS coordinates to maintain a desired travel for the self-propelled machine.

In another example, a boom actuation system 170 moves a boom arm 22 of the implement between a storage position and a deployed position, and the arm is actuated with the boom actuation system.

In one embodiment, a machine-accessible non-transitory medium (e.g., memory 105) contains executable computer program instructions which when executed by a data processing system cause the system to perform operations or methods of the present disclosure It will be appreciated that additional components, not shown, may also be part of the system in certain embodiments, and in certain embodiments fewer components than shown in FIG. 29A and FIG. 29B may also be used in a data processing system. It will be appreciated that one or more buses, not shown, may be used to interconnect the various components as is well known in the art.

Examples—The following are non-limiting examples.

Example 1—A system comprising: a boom; a plurality of cameras attached to the boom; and a plurality of lenses on each camera; wherein not all lenses have a same field of view.

Example 2—The system of Example 1, wherein each camera has a first lens and a second lens.

Example 3—The system of Example 2, wherein the first lens of each camera has a same first field of view as each other first lens, and the second lens of each camera has a same second field of view as each other second lens.

Example 4—The system of any preceding Example, wherein there are two cameras and they are disposed to view an area at least as long as the boom.

Example 5—The system of any preceding Example, wherein there are at least two cameras and they are disposed to view an area that extends past the boom.

Example 6—The system of any preceding Example, wherein each camera is connected to the boom via an arm.

Example 7—The system of Example 6, wherein the arm is movable between a storage position and a deployed position.

Example 8—The system of Example 7, wherein the arm is actuated between the storage position and the deployed position.

Example 9—The system of Example 8 further comprising a boom actuation system to move the boom between a storage position and a deployed position, and the arm is actuated with the boom actuation system.

Example 10—The system of any preceding Example further comprising a monitor, wherein the camera is in signal communication with the monitor.

Example 11—The system of any preceding Example, wherein each camera processes images captured by the camera.

Example 12—The system of any of Examples 1 to 10, wherein the monitor processes images captured by the camera.

Example 13—The system of any of Examples 1 to 12, wherein the plurality of cameras are positioned in combination to view all of a length of the boom and beyond an end of the boom to view any drift of the boom as the boom travels through a field.

Example 14—The system of any of Examples 1 to 13, wherein the plurality of cameras are positioned to view a fluid spray for flow, blockage, or drift, to view for guidance, for obstacle avoidance, to identify plants, to identify weeds, to identify insects, to identify diseases, or combinations thereof as the boom travels through a field.

Example 15—The system of any of Examples 1 to 14, wherein the plurality of cameras have two or more groups of fields of view in which the field of view of each field of view in the group is the same and different from the fields of view of other groups.

Example 16—The system of any of Examples 1 to 15, wherein the plurality of cameras are disposed rearward of the boom along a direction of travel of the system.

Example 17—The system of any of Examples 1 to 16, wherein the plurality of cameras are disposed forward of the boom along a direction of travel of the system.

Example 101—A system comprising a boom; an arm attached to the boom; and a camera connected to the arm; wherein at least one of i) a distance between the boom and the camera is adjustable, ii), an angle between the arm and the boom is adjustable, and iii) the camera is rotatably connected to the arm.

Example 102—The system of Example 101, wherein the distance between the boom and the camera is adjustable and the angle between the arm and the boom is adjustable.

Example 103—The system of Example 102, wherein the camera is rotatably connected to the arm.

Example 104—The system of any of Examples 101 to 103, wherein the arm is a telescoping arm.

Example 105—The system of any of Examples 101 to 104, wherein the arm is a scissor actuator or has a fixed length.

Example 106—The system of any of Examples 101 to 105, wherein the arm is pivotably attached to the boom.

Example 107—The system of Example 101, wherein the arm pivots horizontally in a plane parallel to a ground level.

Example 108—The system of Example 101, wherein the arm is mounted to a top of a boom arm section of the boom and is disposed to pivot downward for storage and upward for deployment.

Example 109—The system of Example 101, wherein the arm is mounted to a bottom of a boom arm section of the boom and is disposed to pivot upward for storage and downward for deployment.

Example 110—The system of Example 101, wherein the arm is mounted in a position between a top and a bottom of a boom arm section of a boom.

Example 111—The system of Example 101, wherein the arm pivots up or down for deployment and down or up for storage.

Example 112—The system of Example 101, further comprising an actuator to adjust an angle between the arm and the boom to any value from 0° to 180°.

Example 113—The system of Example 112, wherein the actuator comprises a hydraulic actuator, a pneumatic actuator, an electric linear actuator, or an electric rotary actuator.

Example 114—The system of Example 101, wherein the adjustments of the camera to the boom and the rotation of the camera cause a change in position of the camera to allow the camera to multitask and provide visual guidance, obstacle avoidance, capture images of plants or weeds, and monitor nozzle performance.

Example 201—A system comprising: a boom; at least one nozzle assembly attached to the boom; and a nozzle or a second nozzle assembly; wherein the at least one nozzle assembly and the second nozzle assembly each comprise a nozzle and at least one light; wherein the at least one light is disposed to illuminate a spray from an adjacent nozzle assembly or nozzle.

Example 202—The system of Example 201, wherein the nozzle assembly comprises two lights.

Example 203—The system of Example 201, wherein at least one light of the first nozzle assembly is disposed to illuminate a spray from the second nozzle assembly that is adjacent to the first nozzle assembly.

Example 204—The system of Examples 201 to 203, further comprising a pulse width modulation actuator to drive to a specified position according to a pulse duration to turn at least one nozzle on or off.

Example 205—The system of Example 201, wherein the first nozzle assembly, the second nozzle assembly, and a nozzle are attached to the boom.

Example 206—The system of Example 201, wherein the first nozzle assembly comprises a nozzle and a light combination.

Example 207—The system of Example 201, wherein the first nozzle assembly comprises a nozzle and two light combination with a first light being disposed to illuminate an adjacent nozzle for a first side of the first nozzle assembly.

Example 208—The system of Example 207, wherein a second light of the first nozzle assembly being disposed to illuminate an adjacent nozzle for a second opposing side of the first nozzle assembly.

Example 209—The system of Example 201, further comprising a first camera attached to the boom, the first camera is disposed to capture images of the first and second nozzle assemblies; and a second camera attached to the boom, the second camera is disposed to capture images of other nozzle assemblies that are attached to the boom.

Example 210—The system of Example 201, further comprising at least one camera attached to the boom.

Example 211—The system of Example 210, wherein the camera is disposed to capture images of a spray pattern of the nozzle of the first assembly.

Example 212—The system of any of Examples 201, 210, and 211, further comprising a processor of the camera or of the system, wherein the processor is configured to determine when the nozzle is spraying and not spraying and to calculate a difference in time between spraying and not spraying to determine a pulse width modulation of the nozzle.

Example 213—The system of Example 212, wherein the determined pulse width modulation is used to signal lights and the at least one camera when to be turned on to capture spraying from the nozzle.

Example 301—A system comprising: a boom; a plurality of nozzles disposed along the boom; a light disposed on the boom to illuminate a spray pattern from at least one nozzle;

a camera disposed on the boom to capture a first image of a spray from the at least one nozzle at a first time and a second image of no spray from the at least one nozzle at a second time; and a processor to calculate a difference between the first time and second time to determine a pulse width modulation of the at least one nozzle.

Example 302—The system of Example 301 further comprising additional lights and additional cameras that are each disposed to illuminate and capture images of other nozzles in the plurality of nozzles, and wherein the pulse width modulation is used to control the additional lights and additional cameras to be on when the other nozzles are on and off when the other nozzles are off.

Example 303—The system of any of Examples 301 to 302, wherein the processor is configured to determine a frequency of the pulse width modulation (PWM) of the at least one nozzle is 10 to 35 Hz.

Example 304—The system of any of Examples 301 to 303, wherein the camera and the at least one nozzle are configured to operate at a same frequency.

Example 305—The system of Example 301, wherein the camera and the at least one nozzle are configured to operate at a different frequency.

Example 306—The system of Example 301, wherein the camera is configured to operate at a frequency less than the frequency of the least one nozzle.

Example 307—The system of any of Examples 301 to 306, wherein an angle of light from the at least one light is not directly aligned with the camera.

Example 308—The system of any of Examples 301 to 307, further comprising a pulse width modulation actuator to drive to a specified position to turn the at least one nozzle on and off.

Example 309—The system of any of Examples 301 to 308, further comprising a pressure sensor to measure a pressure between a fluid source and the at least one nozzle.

Example 310—The system of any of Examples 301 to 309, further comprising a flow meter to measure a fluid flow between a fluid source and the at least one nozzle.

Example 311—The system of any of Examples 301 to 310, wherein the camera is disposed on the boom to capture a third image of a spray from the at least one nozzle at a third time.

Example 312—The system of any of Examples 301 to 311, wherein the processor is configured to determine a first spray angle of the spray from the first image, to determine a second spray angle of the spray from the third image, to compare the first and second spray angles, and to determine if the at least one nozzle is plugged or partially plugged.

Example 313—The system of Example 312, wherein the processor is configured to determine an absolute pressure for the at least one nozzle based on a calibration curve of operating the at least one nozzle at different pressures.

Example 314—The system of Example 313, wherein the processor is configured to determine an absolute flow rate for the at least one nozzle based on a calibration curve of operating the at least one nozzle at different flow rates.

Example 315—A computer-implemented method, comprising capturing, with a camera attached to a boom, a first image and a second image of one or more spray patterns of a nozzle for applying fluid to a field; measuring a first spray angle of the one or more spray patterns of the first image; measuring a second spray angle of the one or more spray patterns of the second image; and determining whether the nozzle is plugged or partially plugged based on comparing the first spray angle and the second spray angle.

Example 316—The method of Example 315, further comprising displaying, with a display device, an amount of plugging for the nozzle if the nozzle is plugged or partially plugged.

Example 317—The method of Example 316, wherein the plugging is displayed as a numerical amount, a color, or a combination of a color and numerical amount.

Example 318—The method of Example 315, further comprising operating the nozzle at different pressures and measuring the spray angle of the spray patterns to generate a calibration curve; and determining an absolute pressure at the spray nozzle based on the calibration curve.

Example 319—The method of Example 315, further comprising operating the nozzle at different flow rates and measuring the spray angle of the spray patterns to generate a calibration curve; and determining an absolute flow rate at the nozzle based on the calibration curve.

Example 320—The method of Example 315, further comprising calculating an average spray angle for the nozzle and a standard deviation for spray angle based on the first and second spray angles; and determining a spray pattern uniformity based on a percentage of spray angles over a given time period that are within a given percentage of the average spray angle or the standard deviation.

Example 321—A computer-implemented method, comprising capturing, with a camera attached to a boom, images of a first spray pattern of a first nozzle and a second spray angle of a second nozzle for applying fluid to a field; determining spray angles of each of the first and second nozzles based on the images; comparing the spray angles of the first and second nozzles; and determining a relative pressure for the first nozzle based on the comparison.

Example 322—The method of Example 321, further comprising determining a difference in spray angles between the first and second nozzles to provide a percentage of pressure of the first nozzle to the second nozzle to determine the relative pressure.

Example 323—The method of Example 321, further comprising determining a difference in spray angles between the first and second nozzles to provide a percentage of flow rate of the first nozzle to the second nozzle to determine a relative flow rate.

Example 401—An autosteered implement comprising: a self-propelled implement; an autosteer controller for controlling traveling of the self-propelled implement; a global positioning system to provide GPS coordinates; a vision guidance system comprising at least one camera and a processor; wherein the global positioning system is in communication with the processor, and the processor is in communication with the autosteer controller; and wherein the processor is configured to modify the GPS coordinates to a modified GPS coordinates to maintain a desired travel for the self-propelled implement.

Example 402—The autosteered implement of Example 401, wherein the autosteered implement comprises a tractor or a sprayer.

Example 403—The autosteered implement of Examples 401 to 402, wherein the autosteer controller is configured to receive signals including the GPS coordinates from the global positioning system (GPS) to automatically direct steering of the implement through actuators that steer wheels or tracks of the autosteered implement.

Example 404—The autosteered implement of Examples 401 to 403, wherein the at least one camera is disposed to capture images for the vision guidance system.

Example 405—The autosteered implement of Example 404, wherein each camera processes images captured by the camera.

Example 406—The autosteered implement of Example 401, wherein the vision guidance system includes a monitor having the processor to process images captured by the at least one camera.

Example 407—The autosteered implement of Example 401, wherein the processor is configured to process the images to determine whether the autosteered implement is driving a desired travel in alignment along rows of crops to avoid damaging the rows of crops.

Example 408—The autosteered implement of Example 407, wherein the processor is further configured to determine if a steering correction is needed to stay on the desired travel, and to determine a GPS offset based on current GPS coordinates and GPS coordinates for the desired travel.

Example 409—The autosteered implement of Example 408, wherein the GPS offset is used to create the modified GPS coordinates to be sent to the autosteer controller.

Example 410—The autosteered implement of any of Examples 401 to 409, wherein the vision guidance system is connected to the GPS and the autosteer controller.

Example 411—The autosteered implement of any of Examples 401 to 410, further comprising a first set of wheels or a track that are aligned in a row spacing between a first row of plants and a second row of plants.

Example 412—The autosteered implement of Example 411, further comprising a second set of wheels or track that are aligned in a row spacing between the second row of plants and a third row of plants.

Example 413—An autosteered machine comprising a self-propelled machine; an autosteer controller for controlling traveling of the self-propelled machine; a global positioning system to provide GPS coordinates; a vision guidance system comprising at least one camera and a processor; wherein the global positioning system is in communication with the processor, and the processor is in communication with the autosteer controller; and wherein the processor is configured to modify the GPS coordinates to a modified GPS coordinates to maintain a desired travel for the self-propelled machine.

Example 414—The autosteered machine of Example 413, wherein the autosteered machine is coupled to an implement.

Example 415—The autosteered machine of Examples 413 to 414, wherein the autosteer controller is configured to receive signals including the GPS coordinates from the global positioning system (GPS) to automatically direct steering of the machine through actuators that steer wheels or tracks of the autosteered machine. The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A system comprising:
a boom;
a plurality of cameras attached to the boom; and
a plurality of lenses on each camera;
wherein on each camera, a first lens of the plurality of lenses has a first field of view and a second lens of the plurality of lenses has a second field of view, wherein the first field of view includes a first portion of the boom and the second field of view includes a second portion of the boom that is different than the first portion of the boom.

2. The system of claim 1, wherein there are at least two cameras and they are disposed to view an area at least as long as the boom.

3. The system of claim 1, wherein there are at least two cameras and they are disposed to view an area that extends past the boom.

4. The system of claim 1, wherein each camera is connected to the boom via an arm.

5. The system of claim 4, wherein the arm is movable between a storage position and a deployed position.

6. The system of claim 5, wherein the arm is actuated between the storage position and the deployed position.

7. The system of claim 6 further comprising a boom actuation system to move the boom between a storage position and a deployed position, and the arm is actuated with the boom actuation system.

8. The system of claim 1 further comprising a monitor, wherein each of the plurality of cameras is in signal communication with the monitor.

9. The system of claim 1, wherein each camera processes images captured by the camera.

10. The system of claim 1, wherein a monitor processes images captured by each of the plurality of cameras.

11. The system of claim 1, wherein the plurality of cameras are positioned in combination to view all of a length of the boom and beyond an end of the boom to view any drift of the boom as the boom travels through a field.

12. The system of claim 1, wherein the plurality of cameras are positioned to view a fluid spray for flow, blockage, or drift, to view for guidance, for obstacle avoidance, to identify plants, to identify weeds, to identify insects, to identify diseases, or combinations thereof as the boom travels through a field.

13. The system of claim 1, wherein the plurality of cameras are disposed rearward of the boom along a direction of travel of the system.

14. The system of claim 1, wherein the plurality of cameras are disposed forward of the boom along a direction of travel of the system.

* * * * *